United States Patent [19]
Mizumoto et al.

[11] Patent Number: 6,115,147
[45] Date of Patent: Sep. 5, 2000

[54] IMAGE READING APPARATUS

[75] Inventors: Manabu Mizumoto, Minamiashigara; Mamoru Murata, Yashio, both of Japan

[73] Assignees: Fuji Photo Film Co., Ltd., Kanagawa-ken; Fuji Photo Optical Co., Ltd., Saitama-ken, both of Japan

[21] Appl. No.: 08/941,308

[22] Filed: Sep. 30, 1997

[30] Foreign Application Priority Data

| Oct. 1, 1996 | [JP] | Japan | 8-260548 |
| Oct. 1, 1996 | [JP] | Japan | 8-260549 |
| Oct. 1, 1996 | [JP] | Japan | 8-261015 |

[51] Int. Cl.[7] .................................................. H04N 1/04
[52] U.S. Cl. ........................................... 358/483; 358/497
[58] Field of Search .................................... 358/497, 487, 358/494, 474, 450, 445, 496, 410, 409, 513, 514; 310/328, 311; 348/219, 297, 207; 250/208.1

[56] References Cited

U.S. PATENT DOCUMENTS

| 5,363,136 | 11/1994 | Sztanko et al. | 348/207 |
| 5,396,142 | 3/1995 | Koblanski | 358/496 |
| 5,400,070 | 3/1995 | Johnson et al. | 348/219 |
| 5,402,171 | 3/1995 | Tagami et al. | 348/219 |
| 5,489,994 | 2/1996 | Torok et al. | 358/483 |
| 5,557,327 | 9/1996 | Hasegawa et al. | 348/219 |
| 5,754,226 | 5/1998 | Yamada et al. | 348/219 |
| 5,822,392 | 10/1998 | Hedengren | 250/208.1 |
| 5,920,342 | 7/1999 | Umeda et al. | 348/219 |

FOREIGN PATENT DOCUMENTS

| 3236687 | 10/1991 | Japan . |
| 07283915 | 10/1995 | Japan . |

Primary Examiner—Cheukfan Lee
Attorney, Agent, or Firm—Sughrue, Mion, Zinn, Macpeak & Seas, PLLC

[57] ABSTRACT

An image reading apparatus has line sensors for optically reading an image carried on an image placed on a subject table and producing an image signal. The line sensors are displaceable by a piezoelectric device which is mounted on a support base by an attachment unit. The attachment unit has an attachment member including a bottom wall having two threaded holes defined therein that are spaced from each other by a given distance Ld. The attachment unit also has an adjustment member which has a screw insertion hole defined therein and extending from rear to front surfaces thereof for insertion therethrough of a screw for horizontally holding the piezoelectric device, and two positioning oblong holes defined vertically therein for passage therein of bolts threaded respectively in the threaded holes in the bottom wall of the attachment member. The attachment unit allows the piezoelectric device to have its projection length adjustable with ease, and also to be replaced independently with a new one, for thereby dispensing with repeated optical positional adjustments, increasing the quality of reproduced images, and reducing the cost of the image reading apparatus.

9 Claims, 29 Drawing Sheets

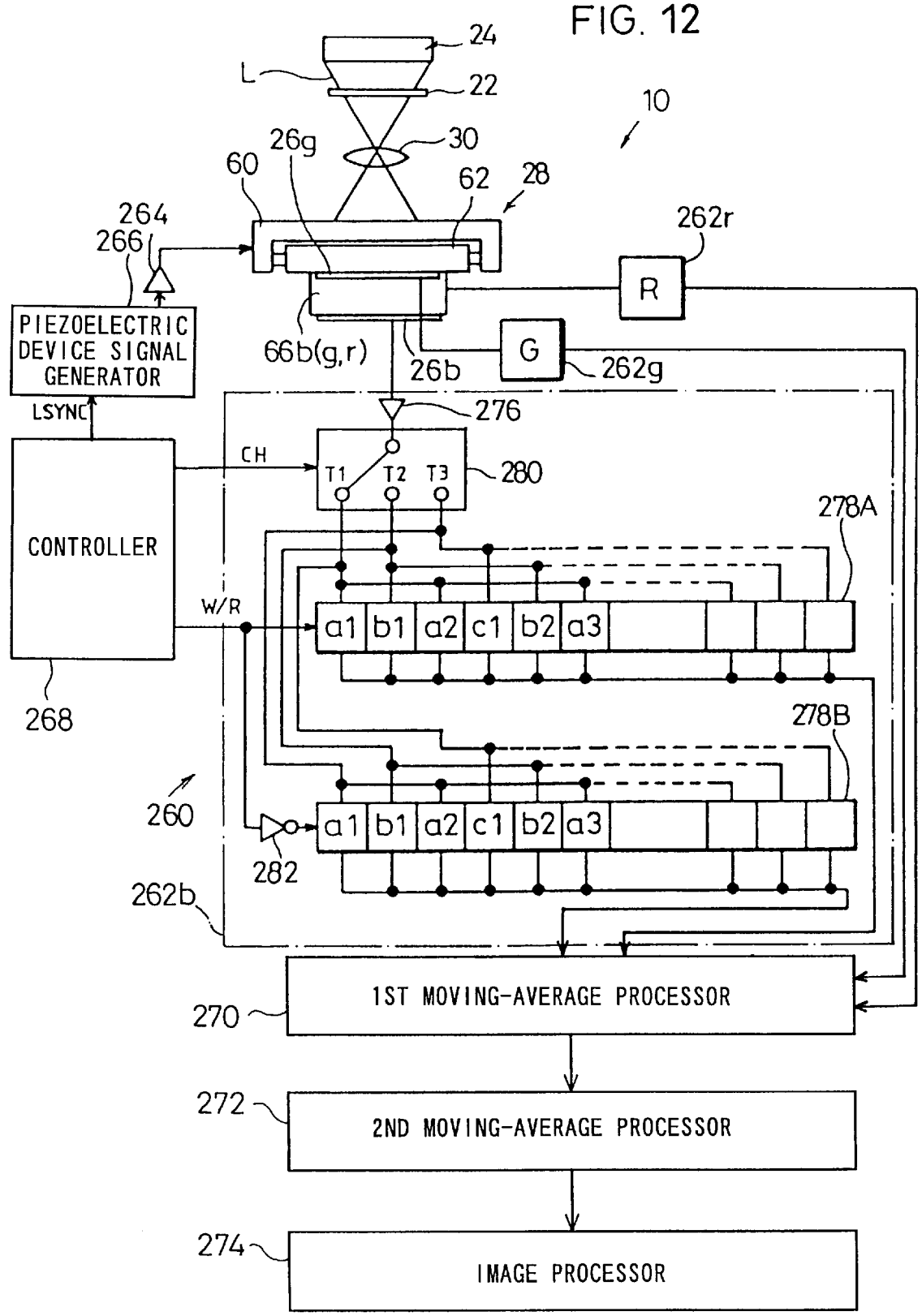

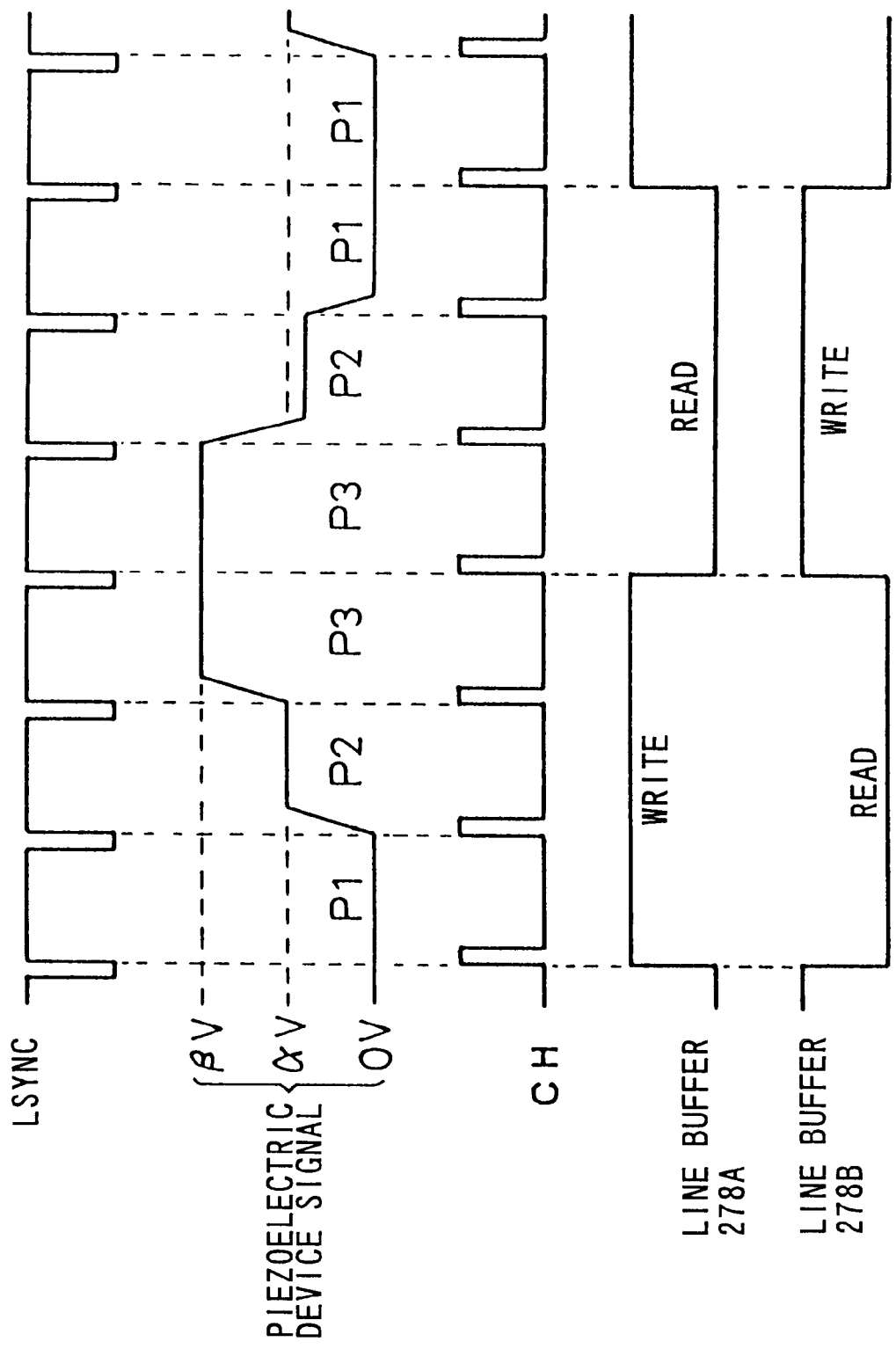

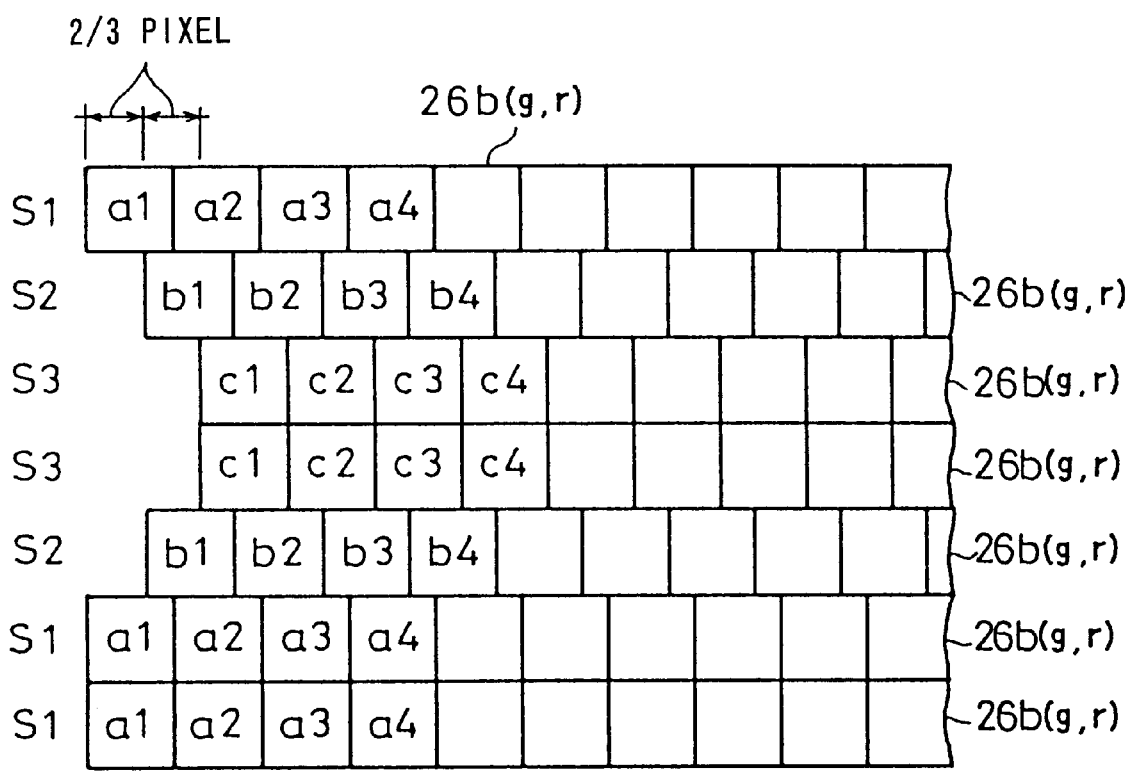

A(n,m)   A(n+1,m)   A(n+2,m)

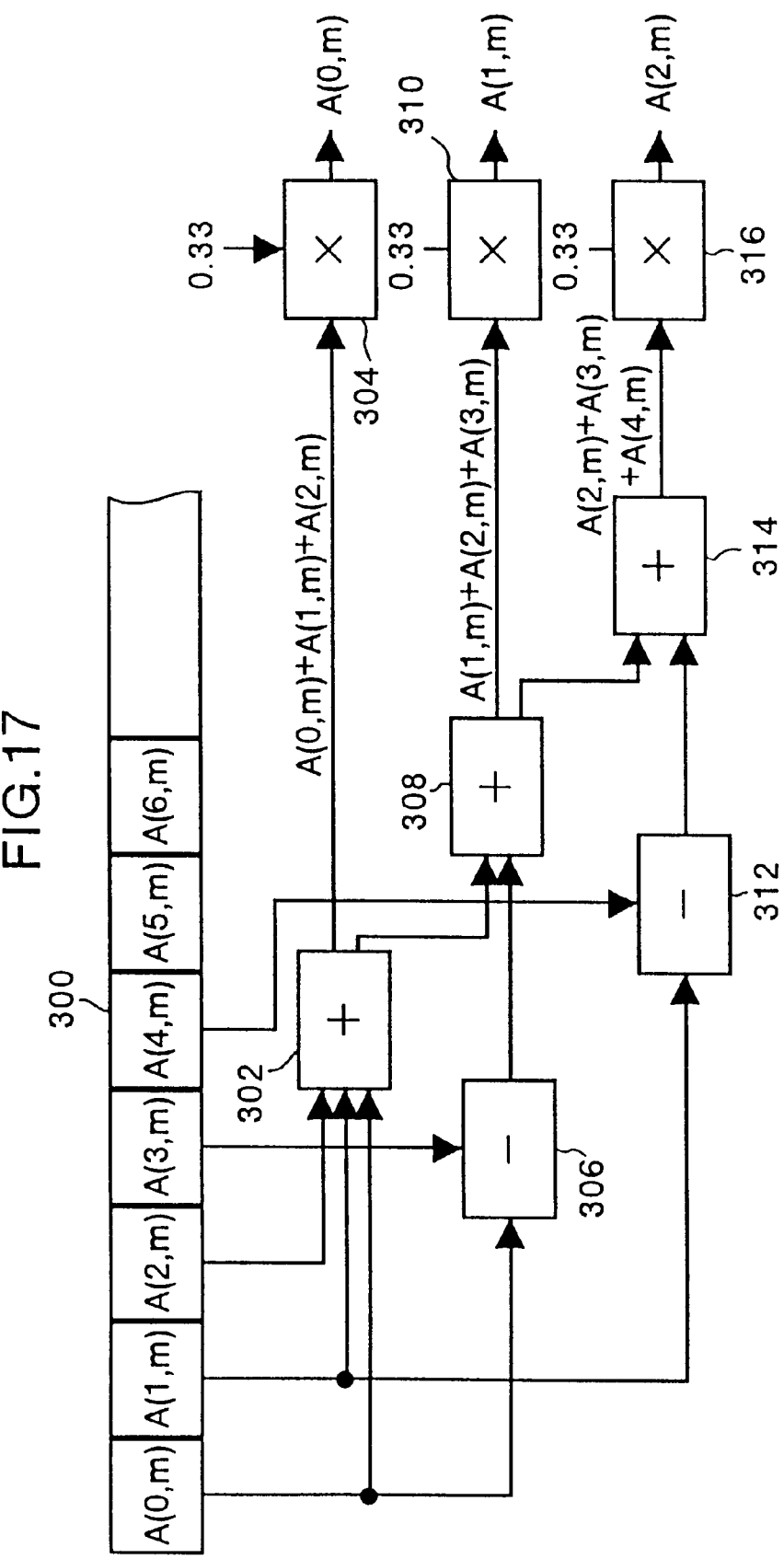

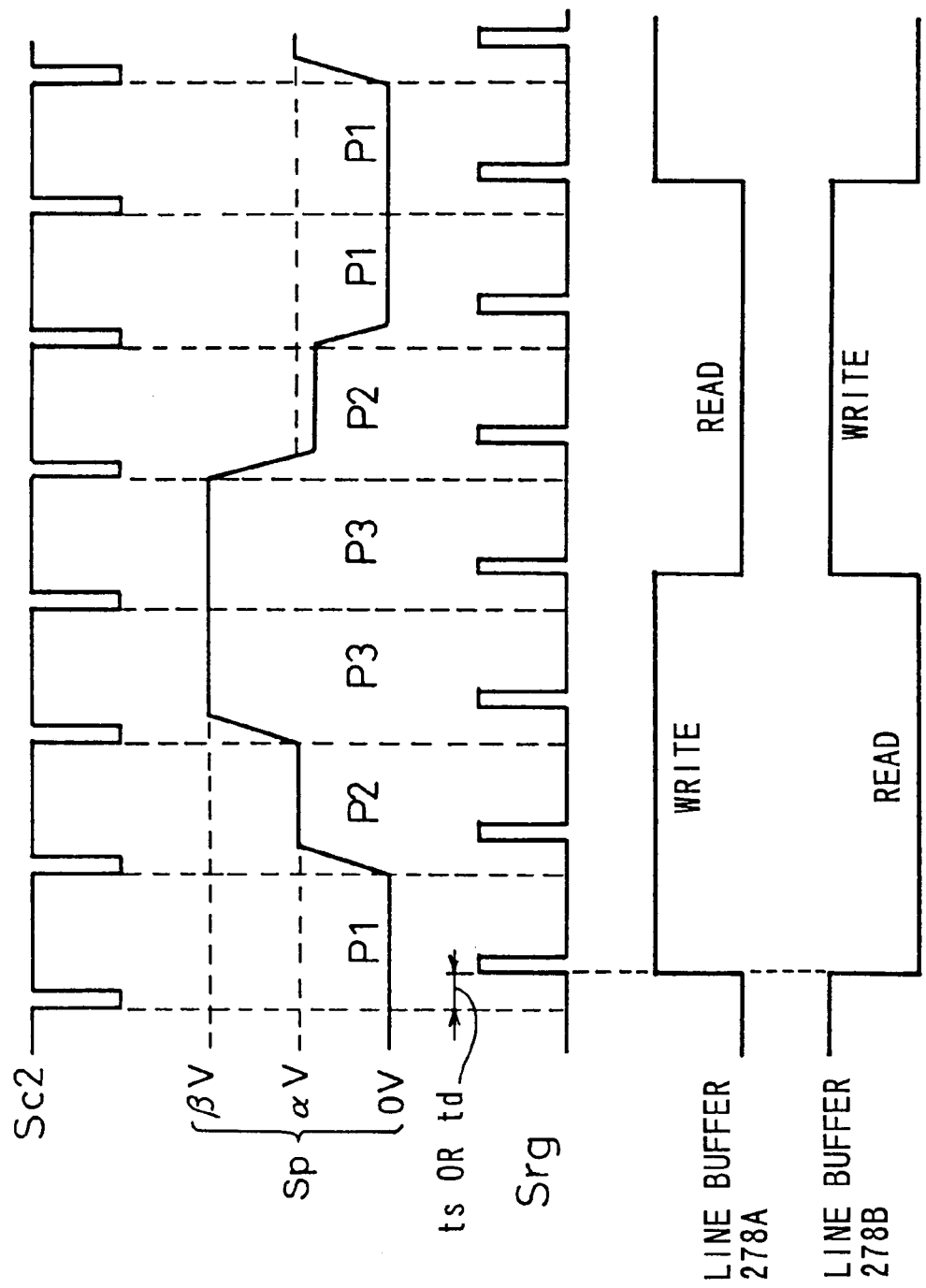

IMAGE READING APPARATUS

BACKGROUND OF THE INVENTION

1. Field of the Invention

The present invention relates to an image reading apparatus for optically reading an image carried on a subject that is placed on a subject holder, and more particularly to the structure of a sensor displacing unit in such an image reading apparatus, for displacing an image reader which essentially reads an image, in the main scanning direction of a line sensor whose signal transfer unit may comprise a CCD or a signal-charge amplifying array of MOS transistors. The image carried on the subject refers to an image that has been formed on the subject by a physical action or a chemical action or a combined physical and chemical action.

2. Description of the Related Art

There have widely been used image reading apparatus for reading an image on a subject with a CCD (Charge-Coupled Device) to generate an image signal. The CCD comprises an array of photoelectric transducers for converting light into electric signals, the photoelectric transducers serving to divide the image into pixels and read the image as pixel signals.

The resolution of the image reading apparatus using the CCD is limited by the number of photoelectric transducers of the CCD. Various techniques have been proposed in the art to increase the resolution while the number of photoelectric transducers used remains unchanged.

For example, Japanese laid-open patent publication No. 3-236687 discloses an area sensor comprising solid-stage imaging elements. The solid-stage imaging elements are displaced in four directions, i.e., upward, downward, leftward, and rightward directions, and pixel signals generated by the solid-stage imaging elements when they read an image in the displaced positions are arranged into a predetermined pattern for thereby increasing the apparent number of pixels provided by the solid-stage imaging elements to achieve an increased resolution.

According to the disclosure of Japanese laidopen patent publication No. 7-283915, a line sensor whose signal transfer unit comprises a CCD is displaced in a main scanning direction along which pixels are arrayed, i.e., signal charges are transferred, for thereby increasing the apparent number of pixels with respect to the main scanning direction. The apparent number of pixels in an auxiliary scanning direction, which extends perpendicularly to the main scanning direction, may be set to a value corresponding to the apparent number of pixels in the main scanning direction by adjusting the speed at which the subject with the image carried thereon is fed in the auxiliary scanning direction. Since the line sensor has a one-dimensional array of photoelectric transducers, it is easier to increase the number of photoelectric transducers than with an area sensor which has a two-dimensional array of photoelectric transducers. Therefore, the line sensor is suitable for use in image reading apparatus which require a high resolution.

When an image is read by a linear sensor such as a CCD linear image sensor comprising photoelectric transducer pixels that are coupled in a main scanning direction, the resolution at which the image is read by the linear sensor basically depends upon the size of each of the photoelectric transducer pixels. The size of each of the photoelectric transducer pixels is defined as the distance between adjacent ones of the photoelectric transducer pixels, e.g., the distance between the centers thereof (referred to as a "pixel pitch").

In order to increase the reading resolution of a linear sensor, it has been proposed to displace the linear sensor back and forth a minute distance in a main scanning direction with a piezoelectric device. Such a process is known as a pixel shifting process. A pixel shifting process as applied to a linear image sensor is disclosed in Japanese laid-open patent publication No. 7-283915.

According the disclosed process, when an image is read by the linear image sensor line by line in the main scanning direction, the linear image sensor is displaced in the main scanning direction by a distance $M = p \cdot q \cdot 2/(2 \cdot m+1)$ where p represents the distance (pixel pitch) between the centers of adjacent ones of the pixels, m represents an integer of 1 or more, and q an integer that is changed successively for the respective lines in the range of from 0 to $2 \cdot m$. After the resolution is increased up to $(2 \cdot m+1)$ times, a moving average is calculated of successive $(2 \cdot m+1)$ pixel signals thus producing pixel signals of the increased resolution.

For example, if $m=1$, then the displaced distance M is $M=0$ when the integer q is $q=0$, the displaced distance M is $M = p \cdot 2/3$, i.e., a 2/3 pixel, when the integer q is $q=1$, and the displaced distance M is $M = p \cdot 4/3$, i.e., a 4/3 pixel, when the integer q is $q=2$. Therefore, the linear image sensor is shifted a 2/3 pixel each time, increasing the resolution three times. The moving average of three pixel signals is calculated in order to smooth level differences between pixel signals from odd- and even-numbered photoelectric transducers if the linear image sensor comprises odd- and even-numbered pixel transfer units.

With the pixel shifting process using the piezoelectric device, the line sensor and the piezoelectric device may be housed in a case and sealed together by a resin body, or may be combined together by a molded resin body. In either case, the line sensor and the piezoelectric device are combined as a single unit.

However, when either one of the line sensor and the piezoelectric device is damaged, the line sensor and the piezoelectric device that are unitized must be replaced with a new unit even though the other of the line sensor and the piezoelectric device may still be usable. Such a replacement practice possibly imposes a high running cost on the user, resulting in a bottleneck in efforts to promote widespread use of the image reading apparatus.

In unitizing the line sensor and the piezoelectric device, the positional relationship between the line sensor and the piezoelectric device, particularly, the distance by which the piezoelectric device projects toward the line sensor, tends to differ from apparatus to apparatus. As a result, the distance that the line sensor is displaced also varies from apparatus to apparatus, possibly causing quality deteriorations of reproduced images.

When the unit of the line sensor and the piezoelectric device is installed in an image reading apparatus, optical positional adjustments are usually effected on the unit. Since the distance by which the piezoelectric device projects toward the line sensor tends to differ from apparatus to apparatus, the operator has to make optical positional adjustments again while viewing a reproduced image. This process makes it complex and needs an increased number of steps to install the unit in the image reading apparatus.

Another problem of the pixel shifting process using the piezoelectric device is that when a drive potential is applied to the piezoelectric device to vibrate it to displace the CCD, the displacement of the CCD becomes stable only a certain period of time after the piezoelectric device has started to be energized.

One solution would be to ignore, for the purpose of signal processing, image signals that are outputted from the line sensor during a period of time (settling time) before the displacement of the CCD becomes stable. According to this solution, however, the period of time in which no image is actually read is relatively long in the total scanning time, possibly impairing the reproducibility of the image.

In the pixel shifting process using the piezoelectric device, the linear image sensor is displaced minute distances by switching the drive voltage applied to the piezoelectric device. To produce a high-quality image signal, it is necessary to read the image after the vibration of the piezoelectric device and hence the linear image sensor is settled to a certain extent.

Heretofore, it has been customary to suppress the vibration of the piezoelectric device and hence the linear image sensor with a mechanical component such as a spring. However, since a certain amount of vibration still remains unsuppressed, the storage of charges in the photoelectric transducer pixels is made effective only after the vibration is settled after the linear image sensor is energized.

SUMMARY OF THE INVENTION

It is therefore an object of the present invention to provide an image reading apparatus which is capable of adjusting the distance that a piezoelectric device projects toward a line sensor to a value that is uniform among image reading apparatus, for thereby dispensing with repeated optical positional adjustments and increasing the quality of reproduced images.

Another object of the present invention is to provide an image reading apparatus which allows a piezoelectric device to be replaced, and hence can be manufactured and used relatively inexpensively, so that the image reading apparatus can contribute to the promotion of widespread use of image reading apparatus.

Still another object of the present invention is to provide an image reading apparatus which permits a line sensor to essentially read an image the line sensor is being displaced by a displacing unit such as a piezoelectric device, for thus eliminating any idling time from a scanning time.

Yet still another object of the present invention is to provide an image reading apparatus which, when an image is read by a line sensor while the line sensor is being displaced, does not impair the sharpness of a reproduced image and can improve the reproducibility of the image.

A further object of the present invention is to provide an image reading apparatus which has a simple arrangement for suppressing vibrations of a linear sensor caused by its displacement for shifting pixels, thereby to produce various advantages including high-quality reproduced images.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 12 is a detailed block diagram of the signal processing system of the image reading apparatus;

FIG. 13 is a timing chart of signals processed in the signal processing system of the image reading apparatus;

FIG. 14 is a diagram showing the relationship between displaced positions of a line sensor of the image reading apparatus;

FIG. 17 is a block diagram of a processing circuit for generating a new pixel signal A(n,m) capable of producing a highly accurate image that is free of irregularities in the main scanning direction;

FIG. 26 is a timing chart of signals processed in the image reading apparatus according to the first modification;

DETAILED DESCRIPTION OF THE PREFERRED EMBODIMENTS

The principles of the present invention are particularly useful when embodied in an image reading apparatus such as a transmissive image reading apparatus.

Figure 1:
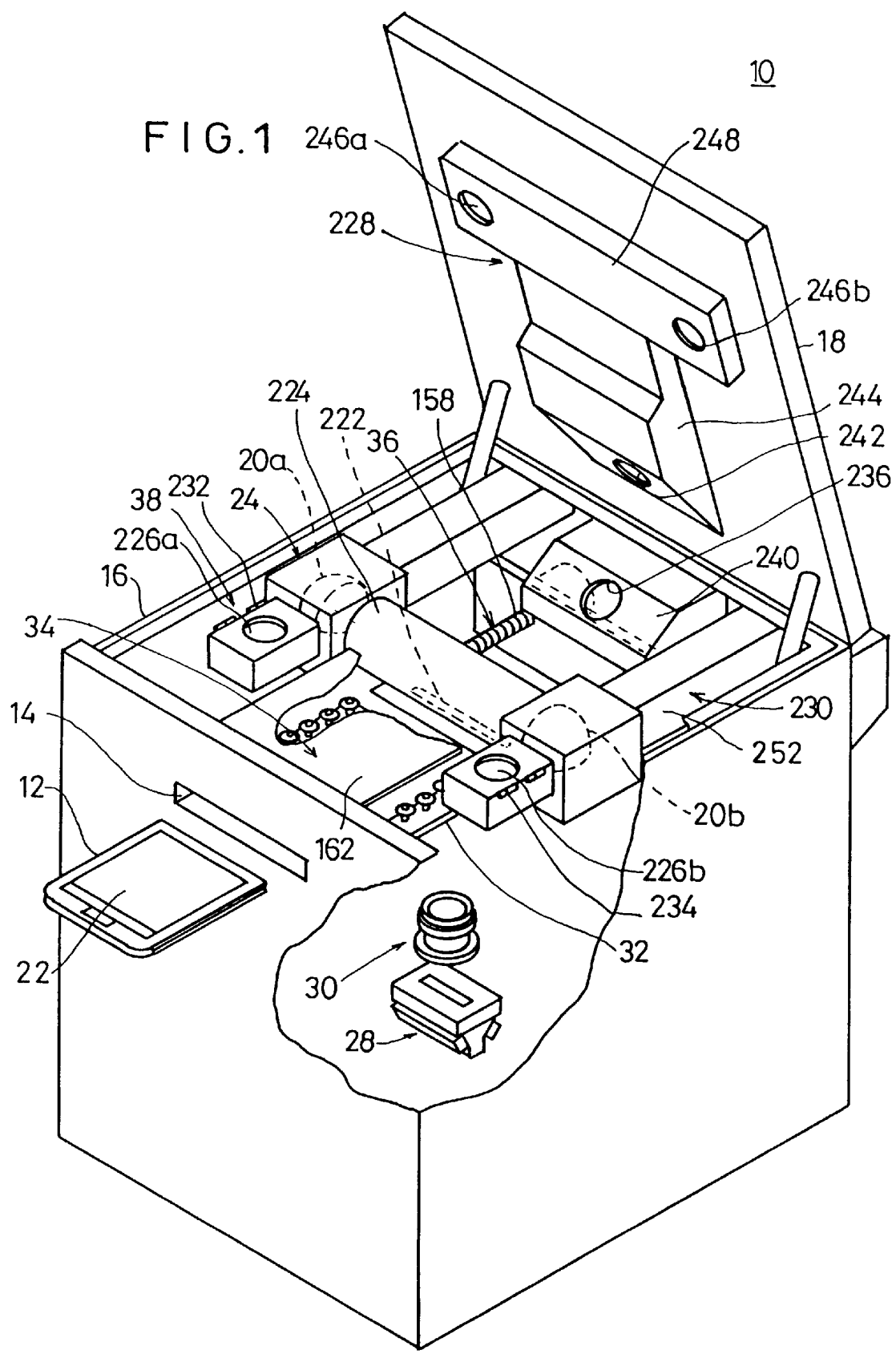
FIG. 1 is a perspective view of an image reading apparatus according to the present invention which is embodied as a transmissive image reading apparatus.

As shown in FIG. 1, an image reading apparatus 10, typically a transmissive image reading apparatus, generally comprises a housing 16 having a cassette insertion slot 14 defined in a front panel thereof for insertion and removal of a subject cassette 12 (see also FIG. 3), and a lid 18 hinged to the housing 16 for opening and closing an upper opening of the housing 16. The housing 16 is in the form of an upwardly open box made of sheet metal by a sheet metal working process, and the lid 18 is in the form of a flat plate made of sheet metal by a sheet metal working process.

The image reading apparatus 10 has a pair of light sources 20a, 20b disposed in opposite sides of an upper portion of the housing 16 and having respective light-emitting surfaces facing each other, an illuminating system 24 for leading illuminating light emitted from the light sources 20a, 20b toward a transmissive subject 22 housed in the subject cassette 12, a transducer 28 having three line sensors 26b, 26g, 26r (see FIGS. 4 and 5) for photoelectrically converting transmitted light from the transmissive subject 22 into electric signals representative of an image carried by the transmissive subject 22, a condenser lens 30 for converging the illuminating light from the illuminating system 24 onto the three line sensors 26b, 26g, 26r, a cassette positioning mechanism 34 for positioning the subject cassette 12 inserted into the housing 16 on a subject table 32, a subject table feed system 36 for feeding the subject table 32 on which the subject cassette 12 is positioned in a direction (hereinafter referred to as an "auxiliary scanning direction") substantially perpendicular to a charge transfer direction (hereinafter referred to as a "main scanning direction") in which electric charges are transferred by the line sensors 26b, 26g, 26r, and a cooling system 38 for applying cooling air to at least the light sources 20a, 20b.

Figure 2:
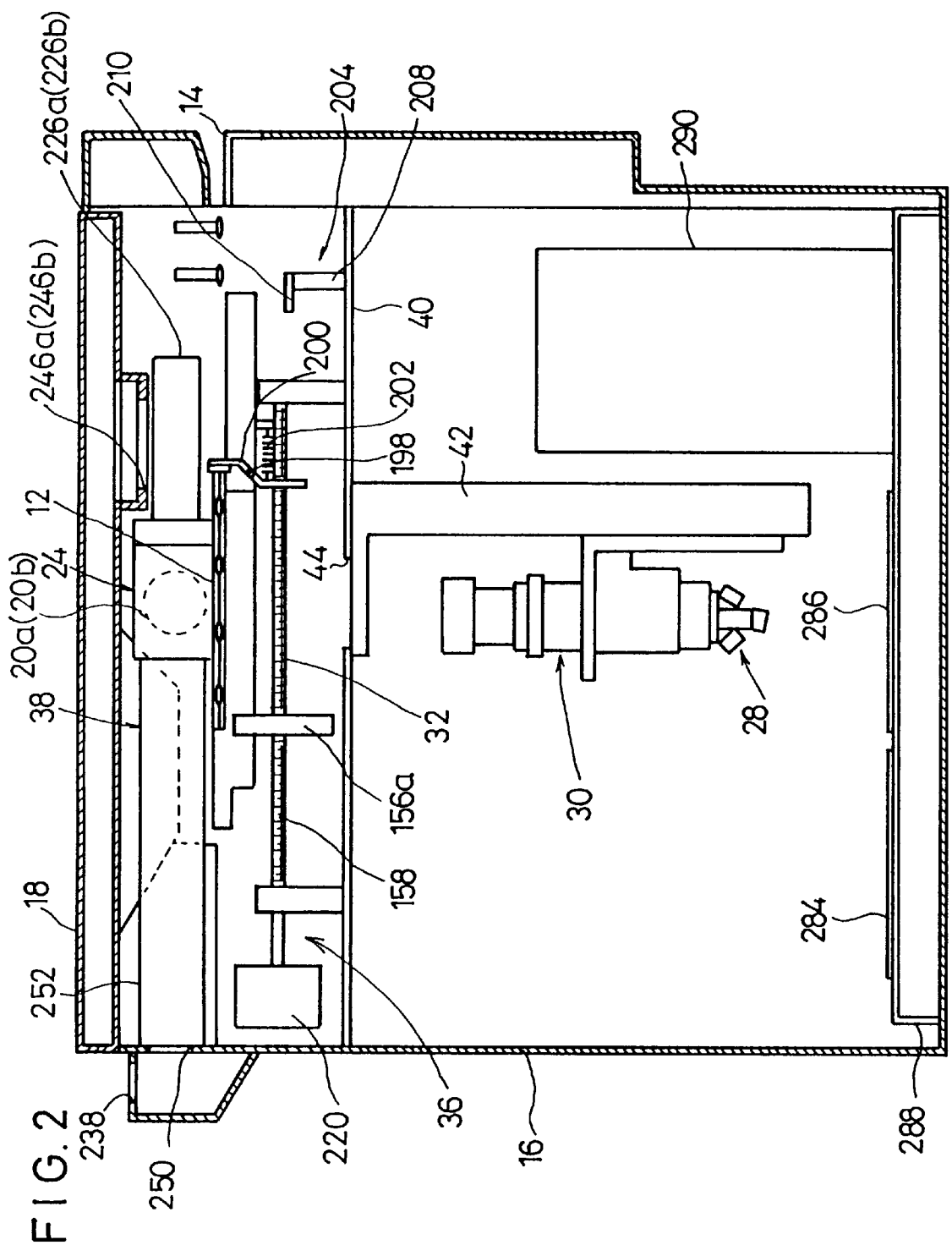
FIG. 2 is a vertical cross-sectional view of the image reading apparatus.

As shown in FIG. 2, a partition 40 parallel to the upper opening of the housing 16 is disposed in the housing 16. The subject table 32, the illuminating system 24, the subject table feed system 36, the cassette positioning mechanism 34, and the cooling system 38 are positioned above the partition 40.

The transducer 28 and the condenser lens 30 are positioned below the partition 40. Specifically, the transducer 28 and the condenser lens 30 are fixed to a reference place 42 that is secured to a lower surface of the partition 40 and extends downwardly from the partition 40.

The partition 40 has a substantially central opening 44 defined therein. Transmitted light from the transmissive subject 22 passes through the opening 44 and is converged by the condenser lens 30 onto the three line sensors 26b, 26g, 26r of the transducer 28.

Figure 3:
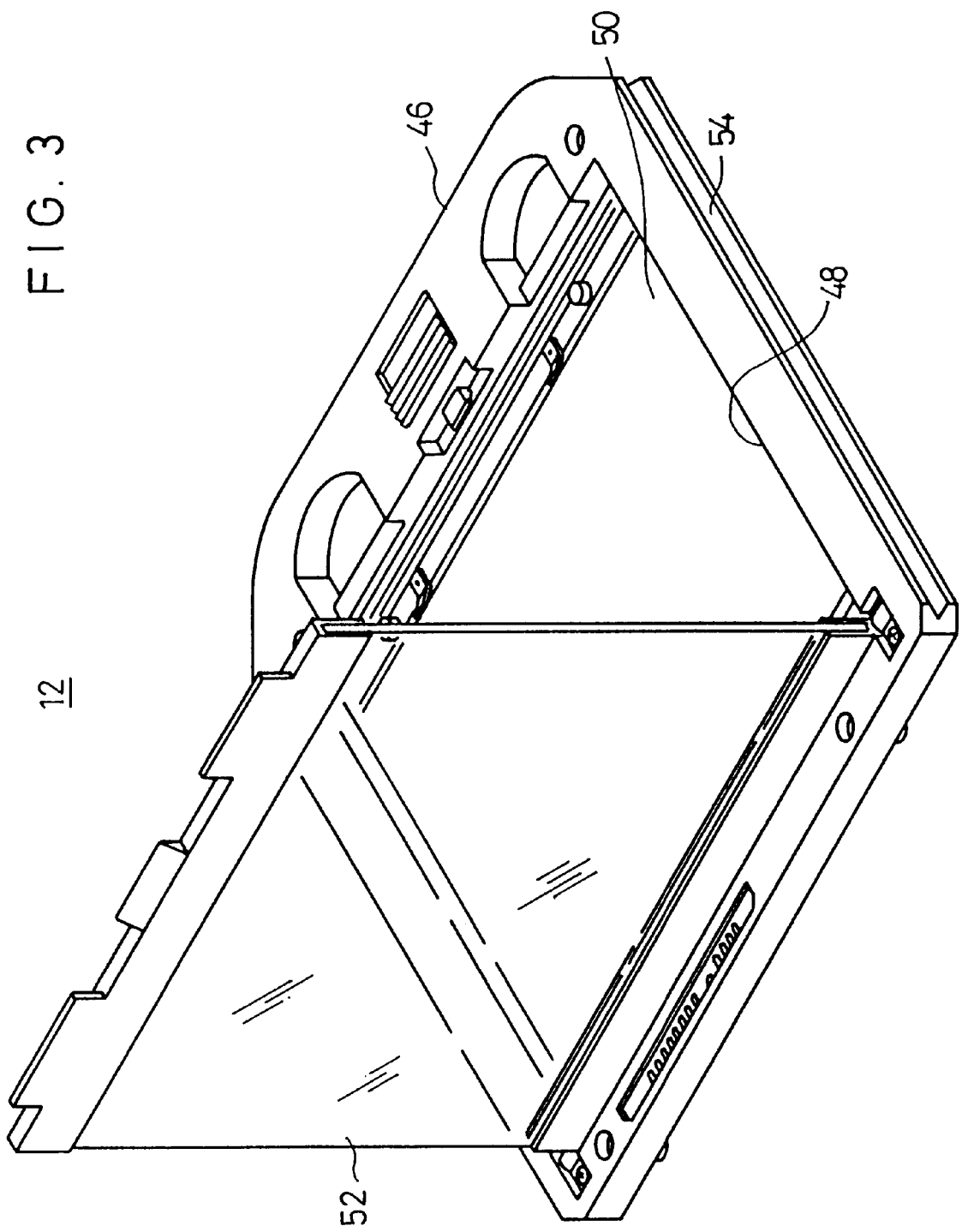
FIG. 3 is a perspective view of a subject cassette to be inserted into the image reading apparatus.

As shown in FIG. 3, the subject cassette 12 comprises a substantially square frame 46 having a rectangular opening 48 defined centrally therein, and a support glass panel 50 and a cover glass panel 52 that are mounted in the rectangular opening 48. The subject cassette 12 serves to hold the transmissive subject 22 sandwiched between the support glass panel 50 and the cover glass panel 52. The frame 46 has V-shaped grooves 54 defined respectively in opposite side edges thereof and extending in the auxiliary scanning direction.

Figure 4:
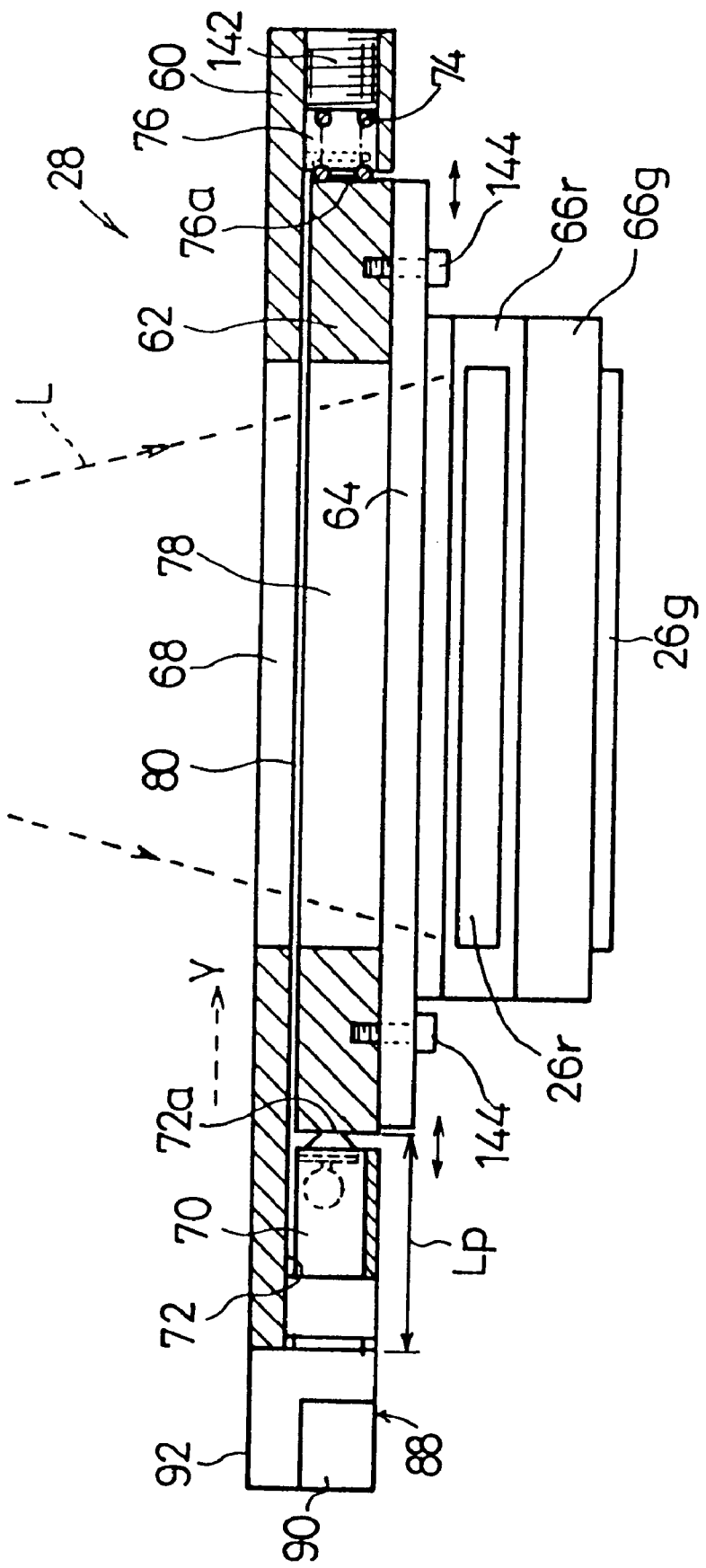
FIG. 4 is a side elevational view, partly in cross section, of a transducer of the image reading apparatus.
Figure 5:
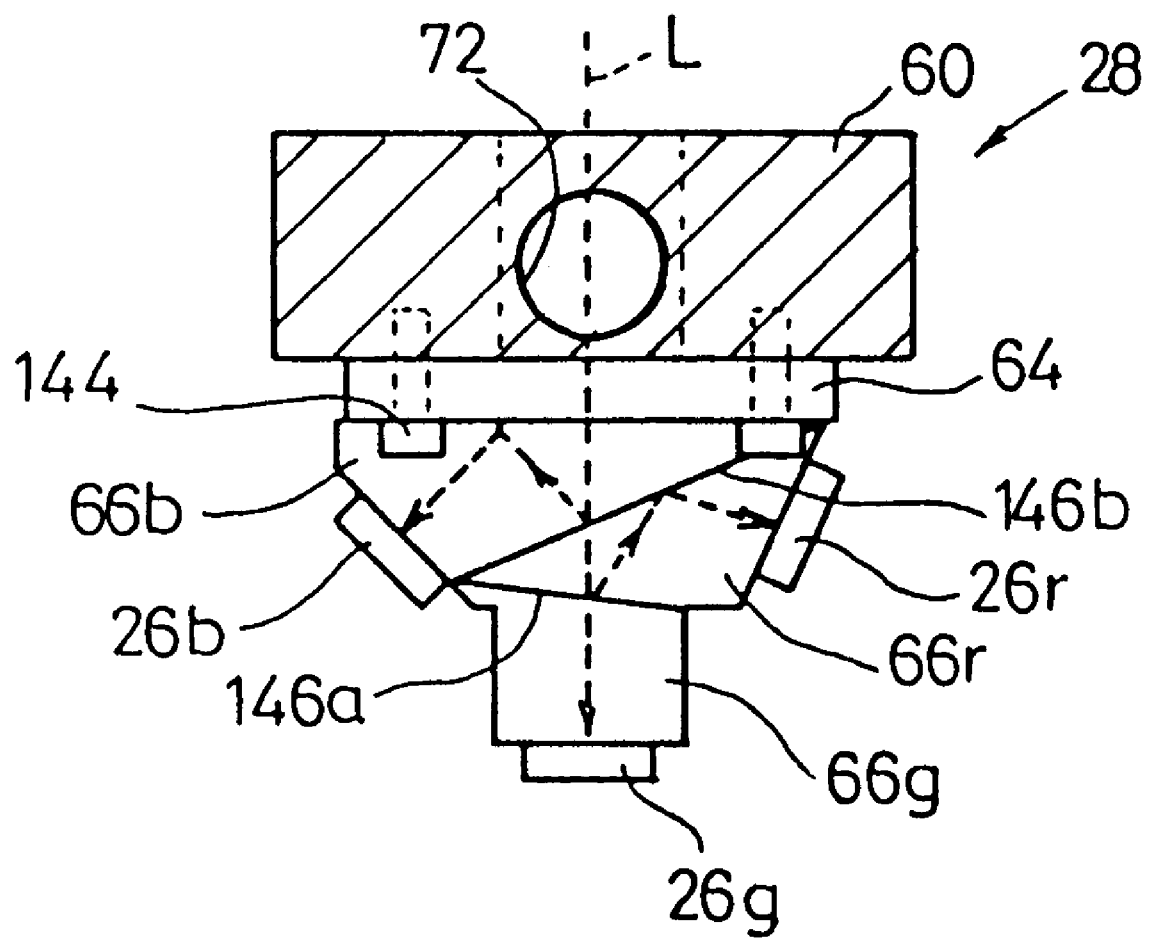
FIG. 5 is a front elevational view, partly in cross section, of the transducer of the image reading apparatus.

As shown in FIGS. 4 and 5, the transducer 28 comprises a support base 60 which is elongate in the main scanning direction (indicated by the arrow Y in FIG. 4), a vibratory base 62 supported on the support base 60 for vibration in the main scanning direction, and prisms 66b, 66g, 66r fixed to the vibratory base 62 by a bracket 64. The line sensors 26b, 26g, 26r are fixedly mounted on the prisms 66b, 66g, 66r, respectively.

The support base 60 has an elongate opening 68 defined centrally therein for guiding illuminating light L from the illuminating system 24 toward the line sensors 26b, 26g, 26r. The support base 60 also has a hole 72 defined in one end thereof for inserting therein a piezoelectric device 70 as a sensor displacing unit, and a hole 76 defined in the opposite end thereof for inserting a helical spring 74 therein.

Figure 6:
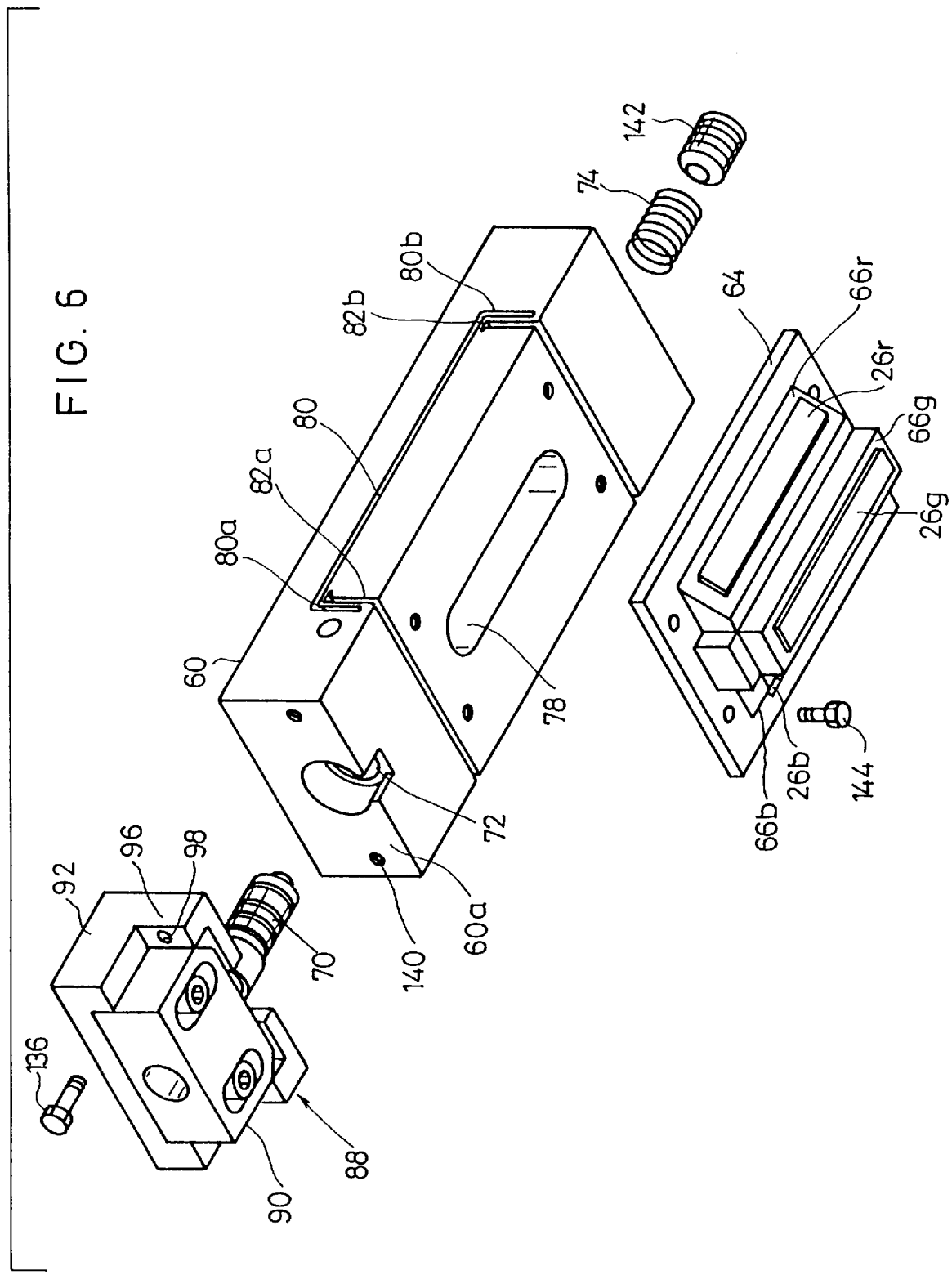
FIG. 6 is a perspective view of the transducer of the image reading apparatus.
Figure 7:
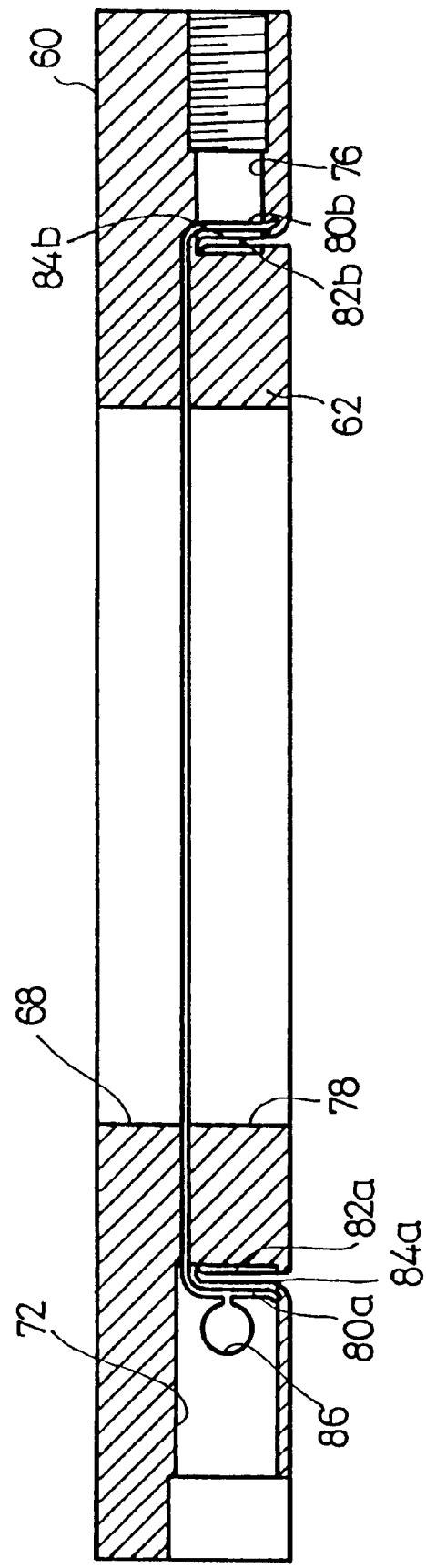
FIG. 7 is a cross-sectional view of a support base and a vibration base of the transducer.

The vibratory base 62 has an elongate opening 78 defined centrally therein, and is integral with the support base 60 with opposite ends thereof aligned with respective inner ends of the holes 72, 76. As shown in FIGS. 6 and 7, the support base 60 and the vibratory base 62 are basically separated from each other by a slit 80 whose opposite ends 80a, 80b are bent in the direction in which the prisms 66b, 66g, 66r are attached. The corners of the slit 80 where the opposite ends 80a, 80b are bent are curved with a given radius of curvature.

Figure 8:
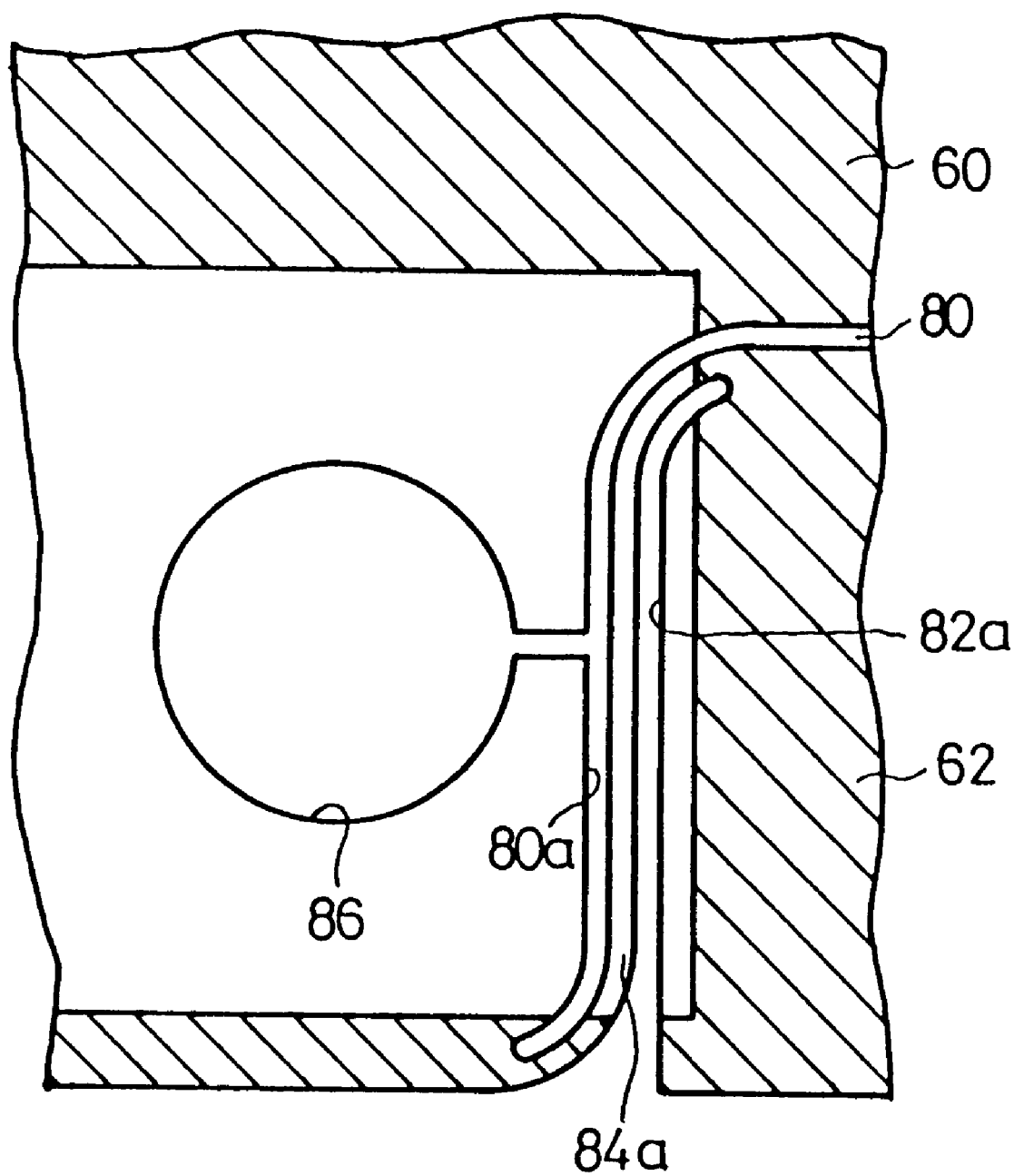
FIG. 8 is an enlarged fragmentary cross-sectional view showing the shapes of an end of a slit and recesses in the support base and the vibration base of the transducer.

The vibratory base 62 has parallel recesses 82a, 82b defined therein which extend away from the prisms 66b, 66g, 66r along the bent opposite ends 80a, 80b of the slit 80, leaving thin walls 84a, 84b (see FIGS. 7 and 8) between the bent opposite ends 80a, 80b and the recesses 82a, 82b. As a result, the vibratory base 62 is resiliently vibratable in the main scanning direction with respect to the support base 60 through the thin walls 84a, 84b.

The recesses 82a, 82b have curved corners having a radius of curvature which is the same as the radius of curvature of the curved corners of the slit 80. Therefore, the thin walls 84a, 84b have curved ends joined to the support base 60 and the vibratory base 62 and having the same radii of curvature as each other. Consequently, when the vibratory base 62 is displaced by the piezoelectric device 70, the thin walls 84a, 84b are prevented from being ruptured under undue stresses, allowing the vibratory base 62 and hence the transducer 28 to operate for a long service life.

The slit 80 and the recesses 82a, 82b can be formed by a wire cutting process carried out by an electrical-discharge wire cutting machine. Since the opposite ends 80a, 80b of the slit 80 need to be terminate within the support base 60, a hole 86 (see FIG. 8) is formed in the support base 60 across the hole 72 for passage of a wire electrode therein.

For installing the piezoelectric device 70 in position, an attachment unit 88 is used which can establish a projection length Lp of the piezoelectric device 70 with high precision. As shown in FIG. 6, the attachment unit 88 has an outer profile substantially in the shape of a rectangular parallelepiped, and comprises an adjustment member 90 for fixing the piezoelectric device 70 and adjusting the projection length Lp thereof, and an attachment member 92 for installing the piezoelectric device 70 on the support base 60 while the attachment member 92 is housing the adjustment member 90.

Figure 9:
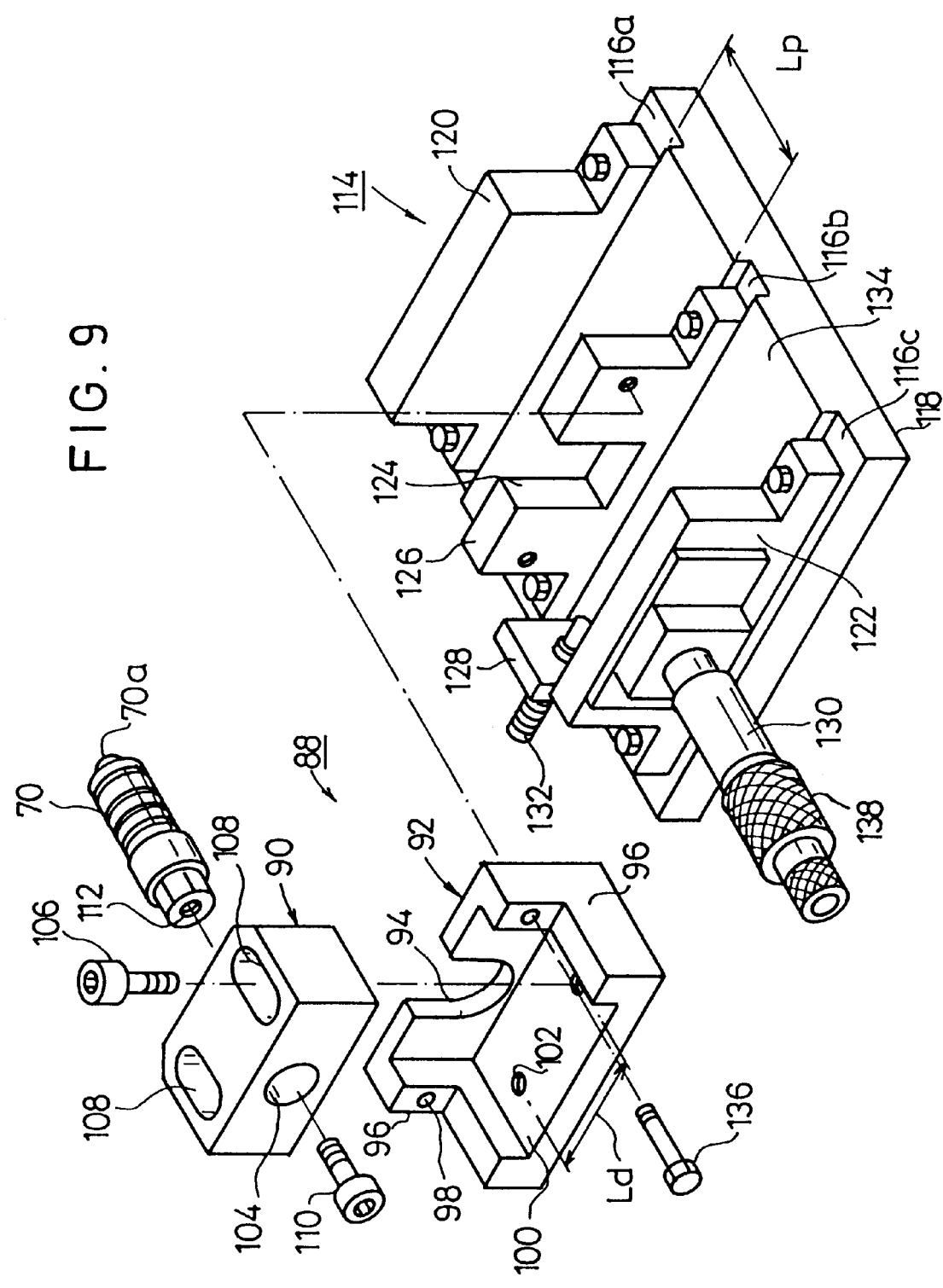
FIG. 9 is an exploded perspective view of an attachment unit attached to the support base of the transducer and an attachment jig for the attachment unit.

As shown in FIG. 9, the attachment member 92 has a substantially L-shaped cross section, and a U-shaped recess 94 defined centrally in a front wall for passage of the piezoelectric device 70 therethrough. The attachment member 92 also has a pair of L-shaped side walls 96 on respective side ends which have respective screw insertion holes 98 defined in steps thereof and extending from rear to front surfaces of the steps parallel to the axis of the piezoelectric device 70, and a bottom wall 100 having two threaded holes 102 defined therein that are spaced from each other by a given distance Ld.

The adjustment member 90 has a screw insertion hole 104 defined therein and extending from rear to front surfaces thereof parallel to the axis of the piezoelectric device 70, and two positioning oblong holes 108 defined vertically therein for passage of bolts 106 therein, each of the positioning oblong holes 108 having a major axis parallel to the axis of the piezoelectric device 70. The positioning oblong holes 108 are spaced from each other by a distance which is the same as the distance Ld by which the threaded holes 102 are spaced from each other. These positioning oblong holes 108 have respective steps (not shown) at a substantially central position along their vertical length for engaging respective flanges of the bolts 106. The piezoelectric device 70 has a threaded hole 112 defined axially in its rear end for receiving a screw 110 that has been inserted through the screw insertion hole 104 in the adjustment member 90.

For attaching the piezoelectric device 70 to the attachment unit 88, there is employed an attachment jig 114 shown in FIG. 9. The attachment jig 114 is substantially rectangular in shape as viewed in plan, and has a base 118 with three parallel spaced grooves 116a, 116b, 116c defined in an upper surface thereof parallel to shorter sides thereof.

An abutment plate 120 is fastened by screws, for example, to the base 118 in and along one of the two outer grooves 116a, and a micrometer attachment plate 122 is fastened by screws, for example, to the base 118 in and along the other groove 116c. A unit attachment plate 126 for fixing the attachment member 92 of the attachment unit 88 is fastened by screws, for example, to the base 118 in and along the central groove 116b. A plunger attachment plate 128 is fastened by screws, for example, to the base 118 between the grooves 116b, 116c in a region near one of longer sides of the base 118. The distance between the abutment plate 120 and the unit attachment plate 126 is set to a predetermined projection length Lp. The unit attachment plate 126 has an upwardly open rectangular recess 124 defined centrally therein.

A micrometer 130 is attached to the micrometer attachment plate 122 which is affixed to the base 118 in and along the groove 116c, and a plunger 132 is attached to the plunger attachment plate 128, thereby completing the attachment jig 114 as shown FIG. 9.

A process of assembling the attachment unit 88 using the attachment jig 114 and a process of installing the assembled attachment unit 88 on the support base 60 will be described below with reference to FIGS. 6 and 9.

As shown in FIG. 9, the piezoelectric device 70 is fastened to the adjustment member 90 by the screw 110. Specifically, while the rear end of the piezoelectric device 70 is held against the front surface of the adjustment member 90, the screw 110 is inserted into the screw insertion hole 104 in the adjustment member 90 and then threaded into the threaded hole 112 in the rear end of the piezoelectric device 70.

Thereafter, the attachment member 92 is affixed to the unit attachment plate 126 on the attachment jig 114. Specifically, the attachment member 92 is placed on an upper unit support surface 134 of the base 118 between the unit attachment plate 126 and the micrometer attachment plate 122, and the front surface of the attachment member 92 is held against a surface of the unit attachment plate 126 which faces the micrometer 130. Screws 136 are then inserted into the respective screw insertion holes 98 in the steps of the side walls 96 and threaded into the unit attachment plate 126.

Then, the attachment member 90 is fixed to the attachment member 92 by the bolts 106. Specifically, the attachment member 90 is placed on the bottom wall 100 of the attachment member 92 on the unit support surface 134, and the bolts 106 are inserted through the respective oblong holes 108 and threaded into the respective threaded holes 102 in the attachment member 92. At this time, the bolts 106 are not tightened too firmly, but tightened to the extent which allows spring washers (not shown) around the bolts 106 to rotate slightly.

Thereafter, the plunger 132 is rotated one or two revolutions to adjust the position of the adjustment member 90 on the attachment member 92.

The micrometer 130 is then operated to adjust the projection length Lp of the piezoelectric device 70. Specifically, a ratchet 138 of the micrometer 130 is turned to press the adjustment member 90 forward until a tip end 70a of the piezoelectric device 70 abuts against the abutment plate 120 when the ratchet 138 starts idling.

Thereafter, the bolts 106 are firmly tightened to secure the adjustment member 90 to the attachment member 92. In this stage, the projection length of the piezoelectric device 70 is set to the distance between the abutment plate 120 and the unit attachment plate 126, i.e., the predetermined projection length Lp.

Then, the micrometer 130 and the plunger 132 are loosened, and the screws 136 are loosened, after which the attachment member 92 is removed. The attachment unit 88 with the piezoelectric device 70 mounted thereon is now completed.

Then, as shown in FIG. 6, the attachment unit 88 is fastened to the support base 60 by the screws 136. Specifically, the tip end portion of the piezoelectric device 70 is inserted into the hole 72 in the support base 60 until the front surface of the attachment member 92 abuts against an end surface 60a of the support base 60. Then, the screws 136 are inserted into the respective screw insertion holes 98 in the steps of the side walls 96 and threaded into respective threaded holes 140 that are defined in the end surface 60a of the support base 60.

Thereafter, the helical spring 74 is inserted into the hole 76 (see FIG. 4) in the support base 60, and a screw 142 is threaded into the hole 76 to press the helical spring 74 into the hole 76.

Then, the bracket 64 on which the prisms 66b, 66g, 66r and the line sensors 26b, 26g, 26r are mounted is fixed to the lower surface of the vibratory base 62. Specifically, the upper surface of the bracket 64 and the lower surface of the vibratory base 62 are held against each other, and the bracket 64 is positioned on the vibratory base 62, after which screws 144 are threaded through the bracket 64 into the vibratory base 62. The installation of the attachment unit 88 on the support base 60, and the installation of the bracket 64 on the vibratory base 62 are now completed.

As shown in FIG. 5, dichroic filters 146a, 146b are disposed between the prisms 66b, 66g, 66r on the bracket 64 for dividing the illuminating light L into light rays having different wavelengths representing colors B (blue), G (green), R (red), and guiding these light rays respectively to the line sensors 26b, 26g, 26r. The line sensors 26b, 26g, 26r serve to photoelectrically convert the respective light rays corresponding electric signals.

Figure 10:
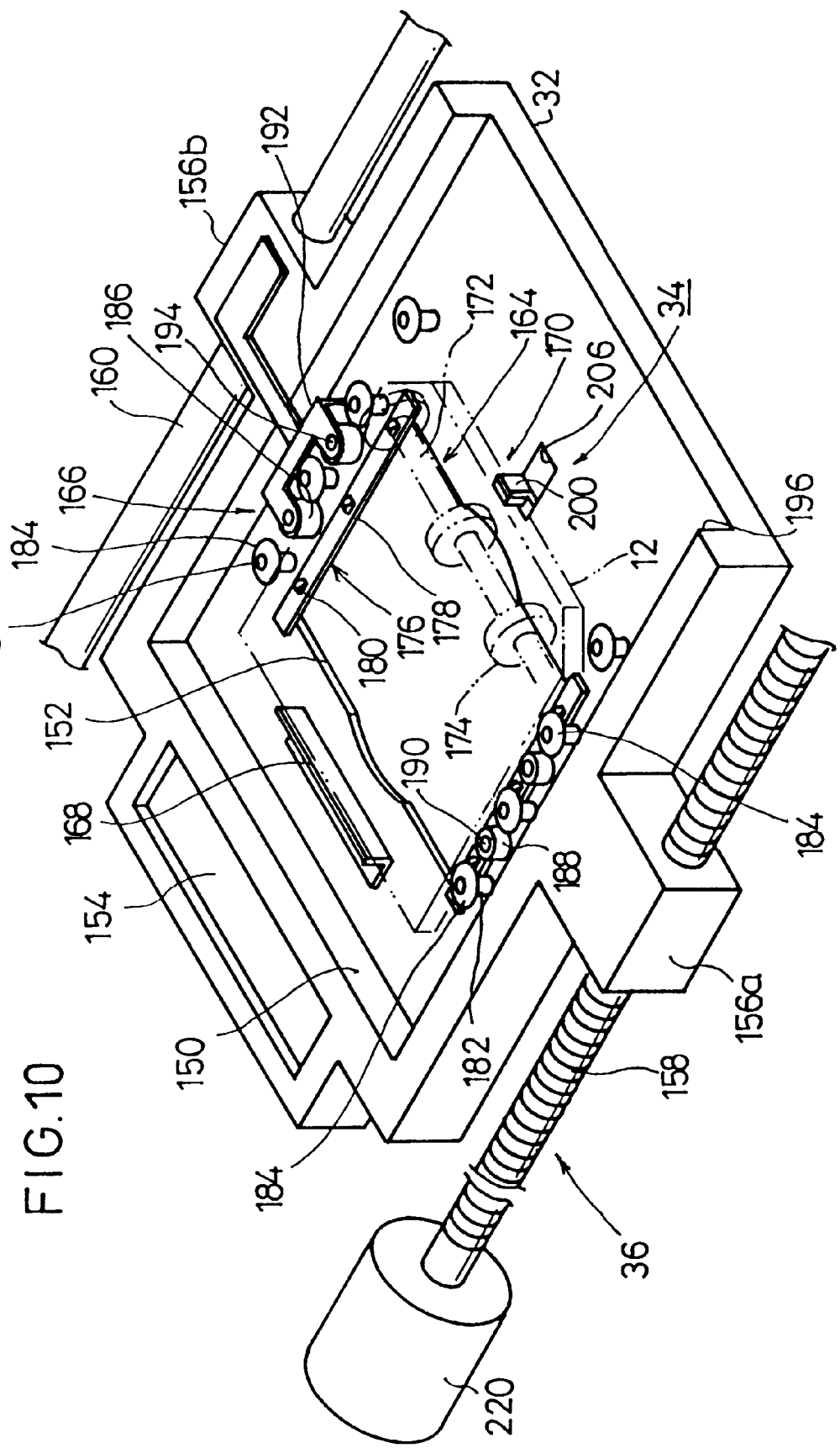
FIG. 10 is a perspective view of a subject table, a cassette positioning mechanism, and a subject table feed system of the image reading apparatus.

As shown in FIG. 10, the subject table 32 is substantially in the form of a flat plate, and has a rectangular cavity 150 defined in its upper surface and extending from a position near an inner end thereof to an opposite outer end near the cassette insertion slot 14, and an opening 152 defined centrally in the bottom of the rectangular cavity 150. The inner end of the subject table 32 supports a transparent plate 154 for assisting a shading process, which is effected to determine a dynamic range for output signals from the line sensors 26b, 26g, 26r, prior to a process of reading an image from the transmissive subject 22.

The subject table 32 also has a pair of lateral bearing arms 156a, 156b extending integrally from opposite side edges thereof. The bearing arm 156a is threaded over a drive shaft 158 of a ball screw feed mechanism of the subject table feed system 36. The bearing arm 156b is disposed over a guide shaft 160 for guiding the subject table 32 to move in the auxiliary scanning direction.

In FIG. 2, the bearing arm 156a is shown as extending laterally and then downwardly. In FIG. 10, the bearing arm 156a is shown as extending laterally only. The bearing arm 156a may be of either one of the shapes shown in FIGS. 2 and 10.

A cassette holder 162 (shown fragmentarily in FIG. 1) is fixedly disposed in the housing 16 in the vicinity of the cassette insertion slot 14 over the subject table 32 as it is in an initial position. The cassette holder 162 is made of sheet metal, for example, and has opposite side edges bent downwardly by a sheet metal working process. The cassette holder 162 and the subject table 32 jointly define a space for accommodating the subject cassette 12. The cassette holder 162 includes an upper panel, except the bent opposite side edges, which is similar in shape to the portion of the subject table 32 except the bearing arms 156a, 156b. Various sensors are mounted on the cassette holder 162 for detecting when the subject cassette 12 is inserted, the type of the subject cassette 12, and when the subject cassette 12 reaches its feed stroke end.

As shown in FIG. 10, the cassette positioning mechanism 34 comprises a loading mechanism 164 for feeding the subject cassette 12 which is inserted in the auxiliary scanning direction along the subject table 32, a side bearing mechanism 166 mounted on the subject table 32 for rollingly bearing sides of the subject cassette 12, and a pressing mechanism 170 for pressing a trailing end of the subject cassette 12 to hold a leading end thereof against a stop 168 mounted on the subject table 32.

The loading mechanism 164 comprises a pair of drive rollers 174 rotatably mounted on a support shaft 172 that is supported on and extends between the bent opposite side edges of the cassette holder 162, and an actuator system (not shown) for rotating the drive rollers 174 through a speed reducer (not shown). The drive rollers 174 are vertically positioned such that their peripheral surfaces will contact the upper surface of the subject cassette 12 placed on the subject table 32.

The side bearing mechanism 166 comprises a pair of guide roller assemblies 176 disposed on respective opposite sides of the opening 152, and a group of positioning rollers and a group of pressing rollers that are arranged in the auxiliary scanning direction on the bottom of the cavity 150.

The guide roller assemblies 176 include respective strips 178 disposed on the respective opposite sides of the opening 152 and extending in the auxiliary scanning direction, and respective arrays of guide rollers 180 rotatably mounted in spaced locations on the strips 178. The guide rollers 180 are rotatable about their own axes in the auxiliary scanning direction over the strips 178.

The group of positioning rollers comprises a plurality of flat rollers 184 rotatably mounted on respective vertical support shafts 182 which are disposed on the bottom of the cavity 150 at the opposite sides of the opening 152. The flat rollers 184 will rollingly ride in the V-shaped grooves 54 (see FIG. 3) in the opposite sides of the subject cassette 12 for gripping the subject cassette 12 from its opposite sides.

The group of pressing rollers comprises a pair of pressing rollers 186 and a pair of pressing rollers 188. The pressing rollers 186 are positioned between the flat rollers 184 on one of the opposite sides of the opening 152 close to the guide shaft 160, and the pressing rollers 188 positioned between the flat rollers 184 on the other of the opposite sides of the opening 152 close to the drive shaft 158. The pressing rollers 188 are rotatably mounted on respective support shafts 190 fixedly mounted on the bottom of the cavity 150. The pressing rollers 188 are positioned transversely of the subject table 32 such that they will contact a side of the subject cassette 12 placed on the subject table 32. The pressing rollers 186 are rotatably mounted on respective support shafts 194 which are normally urged toward the pressing rollers 188 by a leaf spring 192 that is attached to the bearing arm 156b.

When the subject cassette 12 is inserted into the cavity 150 of the subject table 32 from an end 196 thereof, the subject cassette 12 is smoothly guided by the guide rollers 180 of the guide roller assemblies 176. As the subject cassette 12 moves in the cavity 150, the flat rollers 184 enter the V-shaped grooves 54 (see FIG. 3) in the opposite sides of the subject cassette 12, which is pressed toward the drive shaft 158 by the leaf spring 192. Therefore, the subject cassette 12 is transversely pressed by the pressing rollers 186, 188 and introduced into the cavity 150 of the subject table 32 as the pressing rollers 186, 188 roll on the sides of the subject cassette 12. Thus, the subject cassette 12 is positioned transversely of the subject table 32 by the flat rollers 184 and the pressing rollers 186, 188.

The pressing mechanism 170 comprises a presser 200 rotatably mounted on a support shaft 198 (see FIG. 2) supported on the subject table 32, a helical tension spring 202 for biasing an upper end of the presser 200 inwardly in the housing 16, and a release unit 204 fixedly mounted on the partition 40 near the cassette insertion slot 14.

The subject table 32 has a small opening 206 defined in the bottom of the cavity 150 near a front edge of the opening 152, and the upper end of the presser 200 is normally urged to be erected in the small opening 206 by the helical tension spring 202 such that the upper end of the presser 200 extends through and lies above the small opening 206. If the subject cassette 12 is placed on the subject table 32 in covering relation to the opening 152, the end of the subject cassette 12 which is close to the cassette insertion slot 14 is pressed by the upper end of the presser 200, holding the other end of the subject cassette 12 against the stop 168 of the subject table 32. In this manner, the subject cassette 12 is positioned in the longitudinal direction of the subject table 32.

The release unit 204 comprises a support column 208 fixed to the partition 40 and an operating finger 210 fixed to the support column 208. The operating finger 210 is in the form of a rectangular strip made of synthetic resin or metal, and has its plane lying parallel to the auxiliary scanning direction. The operating finger 210 is fixed to the upper end of the support column 208 with its tip end directed inwardly in the housing 16.

When the subject table 32 is in its initial position, the release unit 204 presses a lower portion of the presser 200 inwardly in the housing 16 against the bias of the helical tension spring 202, holding at least an upper portion of the presser 200 parallel to the bottom of the cavity 150. Thus, insofar as the subject table 32 is in its initial position, the subject table 32 is not pressed by the presser 200. When the subject table 32 is fed inwardly in the housing 16 by the subject table feed system 36, the lower portion of the presser 200 is released from the operating finger 210, and the upper portion of the presser 200 is turned inwardly in the housing 16 under the bias of the helical tension spring 202. Accordingly, if the subject cassette 12 is placed on the subject table 32, then the subject cassette 12 is pressed against the stop 168 by the presser 200.

The subject table feed system 36 comprises the drive shaft 158 threaded through the bearing arm 156a, a motor 220 for rotating the drive shaft 158 about its own axis, and the guide shaft 160 extending through the bearing arm 156b. When the motor 220 is energized to rotate the drive shaft 158 in one direction about its own axis, the subject table 32 is fed continuously or stepwise inwardly in the housing 16. When the motor 220 is energized to rotate the drive shaft 158 in the reverse direction about its own axis, the subject table 32 is fed continuously or stepwise in a direction out of the housing 16, i.e., toward the cassette insertion slot 14. Because the drive shaft 158 is threaded through the bearing arm 156a on one side of the subject table 32 and the guide shaft 160 extends through the bearing arm 156b on the other side of the subject table 32, when the subject table 32 is fed by the motor 220 through the drive shaft 158 threaded in the bearing arm 156a, the subject table 32 is stably and smoothly fed in the auxiliary scanning direction because it is guided by the guide shaft 160 extending through the bearing arm 156b.

The illuminating system 24 comprises a cylindrical diffusion cavity 224 having an inner circumferential diffusion surface and a slit 222 defined therein in its longitudinal direction (i.e., the main scanning direction). The illuminating system 24 also includes the light sources 20a, 20b such as halogen lamps, for example, mounted on the respective opposite ends of the diffusion cavity 224. The illuminating light L emitted from the light sources 20a, 20b is diffused and reflected by the inner circumferential diffusion surface of the diffusion cavity 224, and led through the slit 222 toward the subject cassette 12. The illuminating light L then passes through the transmissive subject 22, and travels as transmitted light that carries image information of the transmissive subject 22 toward the condenser lens 30 below the subject cassette 12. The condenser lens 30 converges the transmitted light onto the transducer 28. In the transducer 28, the transmitted light is divided by the prisms 66b, 66g, 66r into respective light rays, which are led to the respective line sensors 26b, 26g, 26r that convert the light rays into respective electric signals.

The cooling system 38 comprises a pair of cooling fans 226a, 226b disposed in an upper portion of the housing 16 in front of the respective light sources 20a, 20b, a suction passage 228 mounted on the lower surface of the lid 18 for introducing cooling air drawn from a rear portion of the housing 16 into a front portion of the housing 16 through the cooling fans 226a, 226b, and a discharge passage 230 for discharging the cooling air expelled from the cooling fans 226a, 226b through the light sources 20a, 20b into the rear portion of the housing 16.

The cooling fan 226a is angularly movably mounted on the inner surface of a side panel of the housing 16 by a hinge 232 such that a lower surface of the cooling fan 226a can angularly move from a position facing the drive shaft 158, i.e., a position where an air inlet port of the cooling fan 226a faces the lower surface of the lid 18, to a position parallel to the vertical direction. Similarly, the cooling fan 226b is angularly movably mounted on the inner surface of an opposite side panel of the housing 16 by a hinge 234 such that a lower surface of the cooling fan 226b can angularly move from a position facing the guide shaft 160, i.e., a position where an air inlet port of the cooling fan 226b faces the lower surface of the lid 18, to a position parallel to the vertical direction.

The suction passage 228 comprises a suction duct 240 of metal such as aluminum, for example, which is disposed in the rear portion of the housing 16 and has an opening 236 facing the lower surface of the lid 18 for guiding cooling air drawn from an air inlet port 238 (see FIG. 2) defined centrally in an upper duct panel on the rear wall of the housing 16, toward the lower surface of the lid 18, a guide duct 244 of metal mounted on a rear portion of the lower surface of the lid 18 and having an opening 242 to be held in registry with the opening 236 for guiding the cooling air introduced through the suction duct 240 along the lower surface of the lid 18 into an upper front portion of the housing 16, and an inlet duct 248 of metal mounted on a front portion of the lower surface of the lid 18 and having a pair of openings 246a, 246b to be held in registry with the respective inlet ports of the cooling fans 226a, 226b.

The discharge passage 230 comprises a pair of duct passageways 252 of metal connected to the respective cooling fans 20a, 20b across the respective light sources 20a, 20b and extending behind the respective light sources 20a, 20b, for guiding the cooling air discharged from the cooling fans 26a, 26b across the respective light sources 20a, 20b toward respective outlet ports 250 (see FIG. 2) that are defined in the rear wall of the housing 16.

Figure 11:
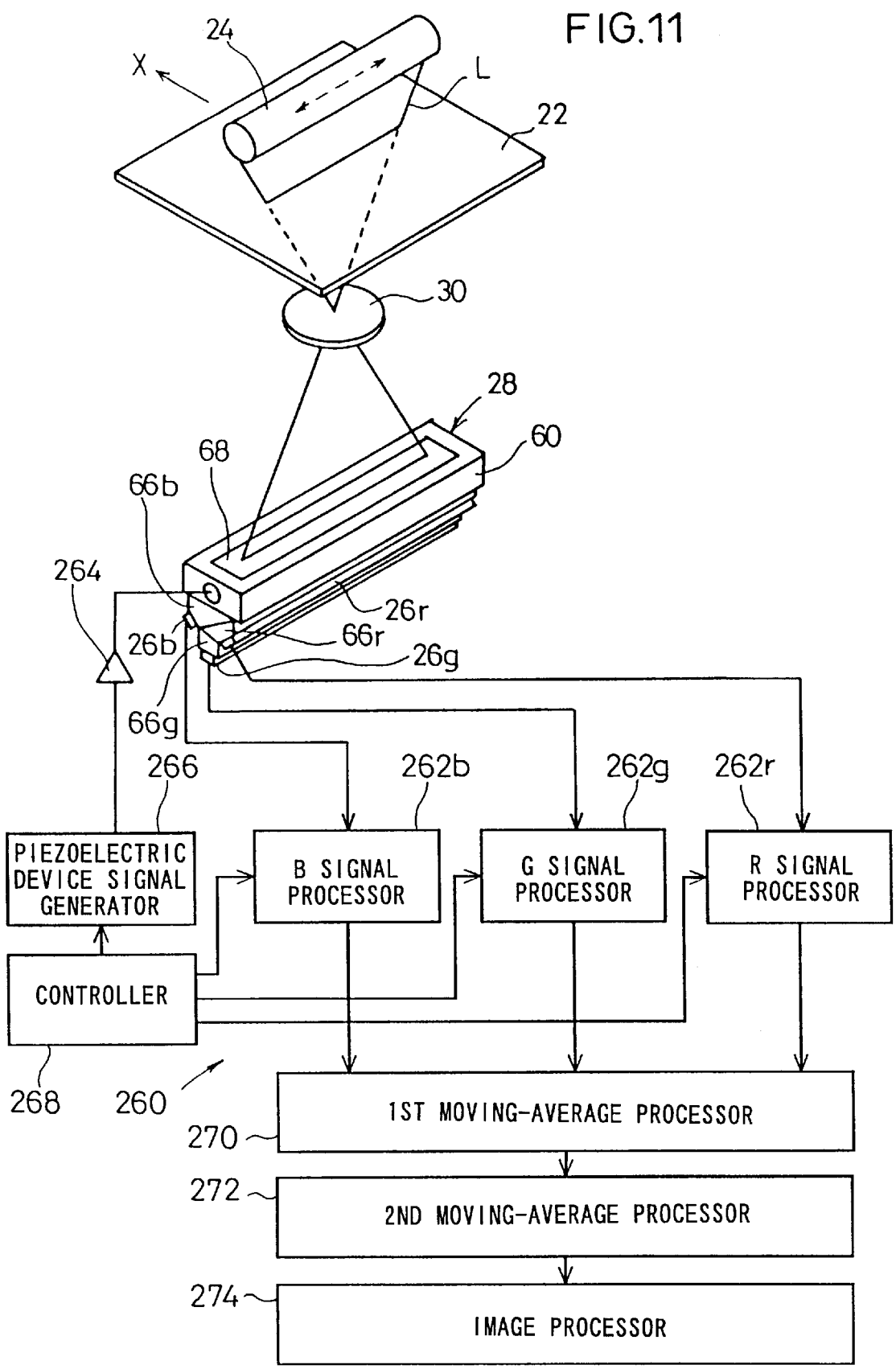
FIG. 11 is a block diagram of a signal processing system of the image reading apparatus.

As shown in FIG. 11, the image reading apparatus 10 has a signal processing system 260 for processing image signals outputted from the respective line sensors 26b, 26g, 26r of the transducer 28. The signal processing system 260 comprises a B signal processor 262b for processing a B signal, representative of the light ray of the color B, from the line sensor 26b, a G signal processor 262g for processing a G signal, representative of the light ray of the color G, from the line sensor 26g, an R signal processor 262r for processing an R signal, representative of the light ray of the color R, from the line sensor 26r, a piezoelectric device signal generator 266 for supplying a drive signal to the piezoelectric device 70 through an amplifier 264, a controller 268 for supplying control signals to the B signal processor 262*b*, the G signal processor 262*g*, and the R signal processor 262*r*, and the piezoelectric device signal generator 266, a first moving-average processor 270 for calculating a moving average of pixel signals processed by the B signal processor 262*b*, the G signal processor 262*g*, and the R signal processor 262*r* with respect to pixel signals from odd- and even-numbered photoelectric transducer elements of the line sensors 26*b*, 26*g*, 26*r*, a second moving-average processor 272 for calculating a moving average of pixel signals in the main and auxiliary scanning directions in order to correct irregularities caused by a displacement of the line sensors 26*b*, 26*g*, 26*r* in the main scanning direction, and an image processor 274 for processing the pixel signals.

As shown in FIG. 12, the B signal processor 262*b* comprises an amplifier 276 for amplifying pixel signals from the line sensor 26*b*, two line buffers 278A, 278B having respective storage areas, each three times larger than the photoelectric transducer elements of the line sensor 26*b*, and a switch 280 for switching between the storage areas of the line buffers 278A, 278B. Each of the G and R signal processors 262*g*, 262*r* is of the same circuit arrangement as the B signal processor 262*b*. The controller 268 is connected directly to the line buffer 278A, and connected to the line buffer 278B through an inverter 282 for inverting a write/read signal W/R from the controller 268.

As shown in FIG. 2, the image reading apparatus 10 has a circuit board 284 incorporating the signal processing system 260 and a circuit board 286 incorporating drive circuits for actuating the various mechanisms and a system controller for controlling these drive circuits, the circuit boards 284, 286 being mounted on an upper surface of a lower plate 288 in the housing 16. Since the circuit boards 284, 286 are disposed on the lower plate 288, the transfer of the heat generated by the illuminating system 24 and the various mechanisms as they operate to these circuit boards 284, 286 is minimized. The lower plate 288 also supports a power supply unit 290 for converting the level of commercial power supply energy into a certain level of energy that is required by the circuit boards 284, 286.

Operation of the image reading apparatus 10 will be described below. In an initial state, the subject table 32 is positioned in the front portion of the housing 16, and has its portion including the cavity end 196 thereof projecting from the cassette insertion slot 14 for receiving the subject cassette 12.

Now, the operator inserts the subject cassette 12 into the cavity 150 of the subject table 32 through the cavity end 196. The inserted subject cassette 12 is detected by a sensor (not shown) on the cassette holder 162 (see FIG. 1), which sends a detected signal to the system controller.

In response to the supplied detected signal, the system controller supplies a startup signal and a control signal indicative of rotation in one direction to a positioning circuit of the cassette positioning mechanism 34. The positioning circuit is energized in response to the startup signal from the system controller. In response to the control signal from the system controller, furthermore, the positioning circuit supplies a control current to the actuator system, such as a motor, of the loading mechanism 164.

The drive rollers 174 of the loading mechanism 164 are now rotated in one direction about their own axis in rolling contact with an upper surface of the inserted subject cassette 12, drawing the inserted subject cassette 12 into the housing 16 and feeding the subject cassette 12 inwardly on the subject table 32. As the subject cassette 12 is fed inwardly, the flat rollers 184 rollingly enter the respective V-shaped grooves 54 in the opposite side edges of the subject cassette 12, and the subject cassette 12 is pressed toward the drive shaft 158 under the bias of the leaf spring 192 that supports the pressing rollers 186. Therefore, the subject cassette 12 is gripped transversely from their opposite edges by the pressing rollers 184, 186, which rotate about their own axis as the subject cassette 12 advances inwardly on the subject table 32. Accordingly, the subject cassette 12 is positioned transversely with respect to the subject table 32 by the flat rollers 184 and the pressing rollers 184, 186.

While the subject cassette 12 is fed by the drive rollers 174, the system controller supplies a startup signal and a control signal indicative of rotation in one direction to a drive circuit of the subject table feed system 36. The drive circuit of the subject table feed system 36 is energized in response to the supplied startup signal. In response to the control signal, the drive circuit supplies a control signal to the motor 220. The motor 220 is energized to rotate the drive shaft 158 in one direction about its own axis, feeding the subject table 32 with the subject cassette 12 placed thereon inwardly in the housing 16.

As the subject table 32 is fed, the lower portion of the presser 200 is turned away from the operating finger 210, and the upper end of the presser 200 is turned inwardly into the small opening 206 under the bias of the helical tension spring 202, thereby pressing the trailing end of the subject cassette 12 inwardly in the housing 16 until the leading end of the subject cassette 12 abuts against the stop 168. The subject cassette 12 is now longitudinally positioned with respect to the subject table 32.

In this manner, the subject cassette 12 is transversely and longitudinally positioned with respect to the subject table 32 by the cassette positioning mechanism 34.

When the image reading apparatus 10 is switched on, or the subject cassette 12 is inserted into the housing 16, or the subject table 32 is fed by the subject table feed system 36, the system controller supplies a startup signal to a drive circuit of the illuminating system 24 and a drive circuit of the cooling system 38.

In response to the startup signal, the drive circuit of the illuminating system 24 supplies a certain current to the light sources 20*a*, 20*b* to enable them to emit illuminating light L. The illuminating light L from the light sources 20*a*, 20*b* is diffused and reflected by the inner circumferential diffusion surface of the cylindrical diffusion cavity 224, and is led through the slit 222 to the subject cassette 12. The illuminating light L applied to the subject cassette 12 passes through the transmissive subject 22, and travels as transmitted light that carries image information of the transmissive subject 22 toward the condenser lens 30 below the subject cassette 12. The condenser lens 30 converges the transmitted light onto the transducer 28.

In response to the startup signal, the drive circuit of the cooling system 38 supplies a control signal to drive motors of the respective cooling fans 226*a*, 226*b* for thereby rotating the cooling fans 226*a*, 226*b*. The cooling fans 226*a*, 226*b* as they rotate draws cooling air from the air inlet port 238, and introduces the cooling air through the suction passage 228, which comprises the suction duct 240, the guide duct 244, and the inlet duct 248, and discharges the introduced cooling air into the front portion of the housing 16. Since the cooling air drawn from the air inlet port 238 flows along the inner surface of the lid 18 into the front portion of the housing 16, the cylindrical diffusion cavity 224 that is positioned underneath the suction passage 228 is cooled by the cooling air. The cooling air that is discharged from the cooling fans 226a, 226b flows through the duct passageways 252 of the discharge passage 230 into the rear portion of the housing 16, from which it is discharged through the outlet ports 250. Because the light sources 20a, 20b are placed across the respective duct passageways 252, the cooling air flowing from the cooling fans 226a, 226b into the duct passageways 252 effectively cools the light sources 20a, 20b for thereby preventing heat from being accumulated in the image reading apparatus 10.

As the subject table 32 is fed, the sensor on the cassette holder 162 for detecting the type of the subject cassette 12 generates a signal indicative of the type of the subject cassette 12, and supplies the generated signal to the system controller. The system controller converts the supplied signal into a code, and determines the type of the subject cassette 12 from the code based on a cassette type table stored in a data ROM. The system controller supplies a signal representing the determined type of the subject cassette 12 to the controller 268 of the signal processing system 260. Based on the supplied signal, the controller 268 establishes and modifies various parameters in the signal processing system 260 for processing signals in a manner best suited to the transmissive subject 22.

When the transparent plate 154 of the subject table 32 arrives at an image reading position directly below the slit 222 of the cylindrical diffusion cavity 224, the line sensors 26b, 26g, 26r reads a white level (high luminance level), and the system controller thereafter determines dynamic ranges of output signals from the line sensors 26b, 26g, 26r and other data thereof based on a density plate inserted in the optical path or black level signals supplied from the line sensors 26b, 26g, 26r. The system controller then supplies the determined data to the controller 268 and the image processor 274.

When the subject table 32 approaches another position, e.g., when the leading end of the subject cassette 12 approaches the image reading position, an optical sensor on the cassette holder 162 for optically detecting the transmissive subject 22 supplies a detected signal to the system controller. In response to the supplied signal, the system controller supplies a speed signal to the drive circuit of the subject table feed system 36 for a high-resolution reading mode. Based on the supplied speed signal, the drive circuit of the subject table feed system 36 issues a control signal to the motor 220 to feed the subject table 32 at a speed suitable for the high-resolution reading mode in combination with a feedback control process.

In response to the supplied signal from the optical sensor, the system controller also supplies a start signal to the controller 268 for starting a process of displacing the line sensors 26b, 26g, 26r. Based on the start signal, the controller 268 periodically supplies a line synchronizing signal LSYNC to the piezoelectric device signal generator 266, and also supplies a selection signal CH and a write/read signal W/R to the B signal processor 262b, the G signal processor 262g, and the R signal processor 262r for processing pixel signals generated by the transducer 28.

At this time, the transmissive subject 22 with an image recorded thereon is two-dimensionally scanned as it is mechanically fed in the auxiliary scanning direction and is illuminated in the main scanning direction by the illuminating system 24. The illuminating light L that has passed through the transmissive subject 22 is converged by the condenser lens 30, and then divided into light rays of the colors B, G, R by the prisms 66b, 66g, 66r and the dichroic filters 146a, 146b (see FIG. 5) of the transducer 28. These light rays of the colors B, G, R are applied to the respective line sensors 26b, 26g, 26r.

In response to the line synchronizing signal LSYNC from the controller 268, the piezoelectric device signal generator 266 supplies a piezoelectric device signal P1 of 0 V through the amplifier 264 to the piezoelectric device 70. The controller 268 supplies the selection signal CH to each of the selectors 280 of the B signal processor 262b, the G signal processor 262g, and the R signal processor 262r, connecting the line sensors 26b, 26g, 26r to a terminal T1 of the switch 280, and also supplies the write/read signal W/R to the line buffers 278A, 278B of each of the B signal processor 262b, the G signal processor 262g, and the R signal processor 262r, placing the line buffer 278A in a write enable mode and the line buffer 278B in a read enable mode.

Since the piezoelectric device signal P1 is of 0 V, the vibratory base 62 sandwiched between the helical spring 74 and the piezoelectric device 70 is held in a non-displaced initial position S1 (see FIG. 14). Pixel signals a1, a2, a3, . . . generated by the photoelectric transducer elements of the line sensors 26b, 26g, 26r are amplified by the amplifier 276, supplied through the terminal T1 of the switch 280, and stored respectively in 1st, 3rd, 6th, 9th, . . . storage areas (see FIG. 12) of the line buffer 278A in the B signal processor 262b, the G signal processor 262g, and the R signal processor 262r.

Based on the line synchronizing signal LSYNC from the controller 268, the piezoelectric device signal generator 266 supplies a piezoelectric device signal P2 of $\alpha$ V through the amplifier 264 to the piezoelectric device 70. The piezoelectric device 70 is now expanded (or contracted), displacing the vibratory base 62 in the main scanning direction by a 2/3 pixel of the photoelectric transducer elements of the line sensors 26b, 26g, 26r. The line sensors 26b, 26g, 26r are displaced to a position S2 that is displaced from the initial position S1 by a distance equal to the 2/3 pixel. In this position S2, the controller 268 supplies a selection signal CH to the switch 280, connecting the line sensors 26b, 26g, 26r to a terminal T2 of the switch 280. Pixel signals b1, b2, b3, . . . generated by the photoelectric transducer elements of the line sensors 26b, 26g, 26r are amplified by the amplifier 276, supplied through the terminal T2 of the switch 280, and stored respectively in 2nd, 5th, 8th, . . . storage areas of the line buffer 278A in the B signal processor 262b, the G signal processor 262g, and the R signal processor 262r.

When the piezoelectric device signal generator 266 supplies a piezoelectric device signal P2 of $\beta$ V through the amplifier 264 to the piezoelectric device 70 in response to the line synchronizing signal LSYNC from the controller 268, the piezoelectric device 70 is further expanded (or contracted), displacing the vibratory base 62 in the main scanning direction by a 2/3 pixel of the photoelectric transducer elements of the line sensors 26b, 26g, 26r. The line sensors 26b, 26g, 26r are displaced to a position S3 that is displaced from the initial position S1 by a distance equal to the 4/3 pixel. In this position S3, the controller 268 supplies a selection signal CH to the switch 280, connecting the line sensors 26b, 26g, 26r to a terminal T3 of the switch 280. Pixel signals c1, c2, c3, . . . generated by the photoelectric transducer elements of the line sensors 26b, 26g, 26r are amplified by the amplifier 276, supplied through the terminal T3 of the switch 280, and stored respectively in 4th, 7th, 10th, . . . storage areas of the line buffer 278A in the B signal processor 262b, the G signal processor 262g, and the R signal processor 262r.

In this manner, the line buffer 278A in the B signal processor 262b, the G signal processor 262g, and the R signal processor 262r successively stores the pixel signals a1, b1, a2, c1, b2, a3, . . . along a first main scanning line which are generated while the line sensors 26b, 26g, 26r are being displaced along a forward stroke in the main scanning direction from the initial position S1 through the position S2 to the position S3.

Then, the controller 268 supplies a selection signal CH to the switch 280, connecting the line sensors 26b, 26g, 26r to the terminal T1 of the switch 280, and also supplies the write/read signal W/R to the line buffers 278A, 278B of each of the B signal processor 262b, the G signal processor 262g, and the R signal processor 262r, placing the line buffer 278A in the read enable mode and the line buffer 278B in the write enable mode. While controlling the switch 280, the controller 268 controls the piezoelectric device signal generator 266 to successively supply the piezoelectric device signals P3, P2, P1 for storing pixel signals c1, c2, c3, . . . from the line sensors 26b, 26g, 26r in the position S3, pixel signals b1, b2, b3, . . . from the line sensors 26b, 26g, 26r in the position S2, and pixel signals a1, a2, a3, . . . from the line sensors 26b, 26g, 26r in the initial position S1 into the line buffers 278B. The piezoelectric device signal P2 that is generated subsequently to the piezoelectric device signal P3 is of a level lower than the α V in view of the hysteresis of the piezoelectric device 70.

Consequently, the line buffer 278B in the B signal processor 262b, the G signal processor 262g, and the R signal processor 262r successively stores the pixel signals a1, b1, a2, c1, b2, a3, . . . along a second main scanning line which are generated while the line sensors 26b, 26g, 26r are being displaced along a return stroke in the main scanning direction from the position S3 through the position S2 to the initial position S1. The pixel signals thus stored in the line buffers 278A, 278B provide a resolution that is three times higher than the resolution which would be achieved if the line sensors 26b, 26g, 26r were fixed in position. While the line buffer 278B is operating to store pixel signals, the first moving-average processor 270 reads the pixel signals along the first main scanning line from the line buffer 278A in the read enable mode, and calculates a moving average of two adjacent pixel signals. Similarly, while the line buffer 278A is operating to store pixel signals, the first moving-average processor 270 reads the pixel signals along the second main scanning line from the line buffer 278B in the read enable mode, and calculates a moving average of two adjacent pixel signals.

Specifically, the line buffer 278A alternately stores odd-numbered pixel signals b1, c1, a3, . . . and even-numbered pixel signals a2, b2, . . . (see FIGS. 12 and 14) from the photoelectric transducer elements of the line sensors 26b, 26g, 26r, except the first pixel signal a1. The first moving-average processor 270 determines an average of adjacent pixel signals b1, a2; a2, c1; c1, b2, . . . as a moving average signal of two adjacent pixel signals. As a result, the first moving-average processor 270 produces pixel signals which are averages of odd- and even-numbered pixel signals from the photoelectric transducer elements of the line sensors 26b, 26g, 26r.

The produced pixel signals, in which irregularities due to the odd- and even-numbered pixel signals from the line sensors 26b, 26g, 26r have been averaged, are then supplied to the second moving-average processor 272, which removes irregularities owing to the displacement in the main scanning direction of the line sensors 26b, 26g, 26r.

Figure 15A:
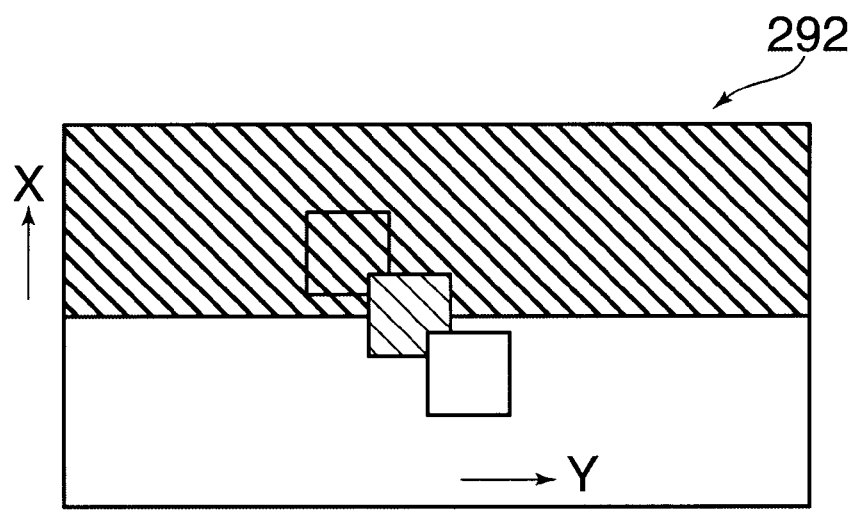
FIGS. 15A and 15B are diagrams showing an array of pixel signals produced when an image carried on a transmissive subject and representing a boundary between light and dark regions along a main scanning direction is read by a line sensor and a generated image signal is processed by a first moving-average processor.
Figure 15B:
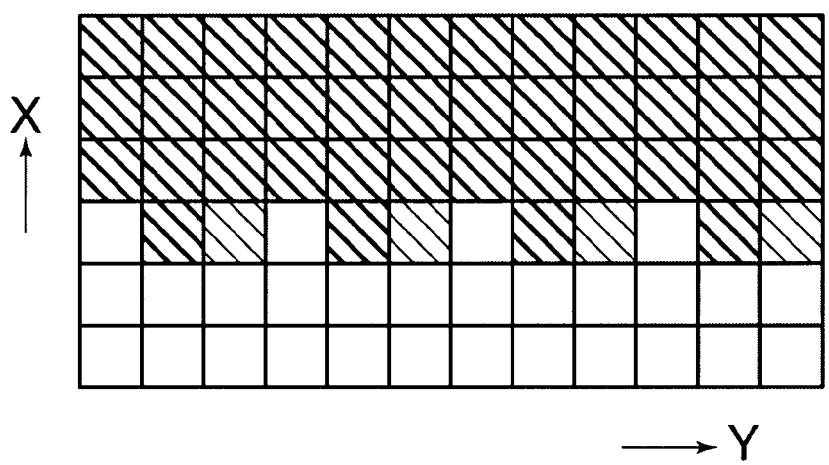
Figure 16A:
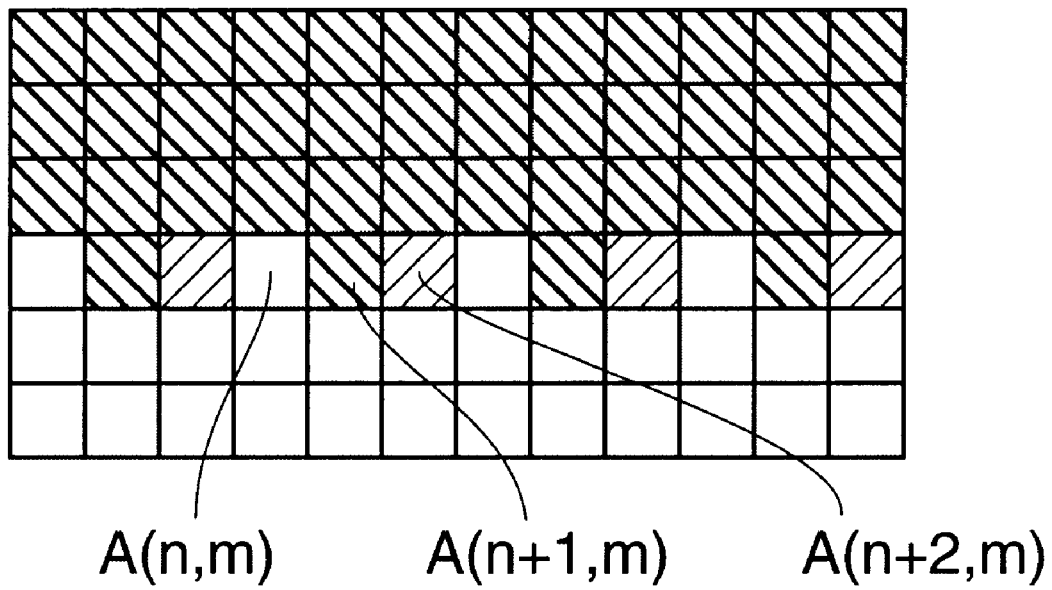
FIGS. 16A and 16B are diagrams showing an array of pixel signals produced when an image carried on a transmissive subject and representing a boundary between light and dark regions along a main scanning direction is read by the line sensor and a generated image signal is processed by a second moving-average processor.

Specifically, if an image 292 shown in FIG. 15A is read by the transducer 28, the first moving-average processor 270 generates pixel signals arranged in the main scanning direction and having signal levels as shown in FIG. 15B. The second moving-average processor 272 calculates a moving average of three adjacent pixel signals that are successively arranged in the main scanning direction, thereby removing irregularities of the pixel signals in the main scanning direction. Specifically, if it is assumed that three pixel signals, i.e., nth, (n+1)th, and (n+2)th pixel signals, along an mth scanning line in the main scanning direction are represented respectively by A(n,m), A(n+1,m), A(n+2,m), as shown in FIG. 16A, then the pixel signal A(n,m) is converted into a new pixel signal A(n,m) by a moving average process according to the following equation:

$$A(n,m) = \{A(n,m) + A(n+1,m) + A(n+2,m)\}/3$$

Figure 16B:
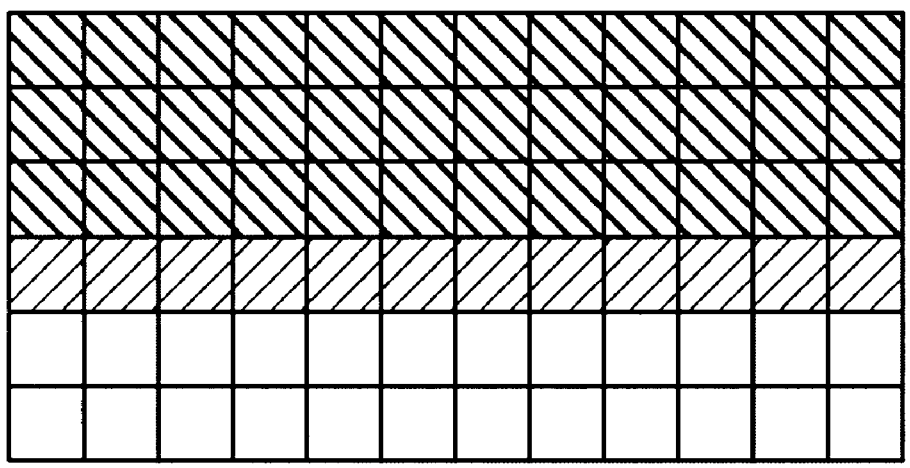

Likewise, the pixel signal A(n+1,m) is also converted into a new pixel signal A(n+1,m) by a moving average process. As shown in FIG. 16B, an image generated on the basis of the new pixel signals A(n,m), A(n+1,m), . . . is a highly accurate image free of irregularities in the main scanning direction.

The new pixel signal A(n,m) may be generated by a processing circuit as shown in FIG. 17. As shown in FIG. 17, the pixel signal A(n,m) transferred from the first moving-average processor 270 is stored in a line buffer 300 for each scanning line. Pixel signals A(0,m), A(1,m), A(2,m), for example, stored in the line buffer 300 are added by an adder 302, and the sum signal from the adder 302 is multiplied by "0.33" by a multiplier 304, which generates a new pixel signal A(0,m) that is an average of the pixel signals A(0,m), A(1,m), A(2,m). The pixel signal A(0,m) is subtracted from a pixel signal A(3,m) from the line buffer 300, and the difference signal is added to the sum signal from the adder 302 by an adder 308. The sum signal from the adder 308 is multiplied by "0.33" by a multiplier 310, which generates a new pixel signal A(1,m) that is an average of the pixel signals A(1,m), A(2,m), A(3,m). The pixel signal A(1,m) is subtracted from a pixel signal A(4,m) from the line buffer 300, and the difference signal is added to the sum signal from the adder 308 by an adder 314. The sum signal from the adder 314 is multiplied by "0.33" by a multiplier 316, which generates a new pixel signal A(2,m) that is an average of the pixel signals A(2,m), A(3,m), A(4,m). The above process is repeatedly effected on pixel signals from the line buffer 300 to produce the new pixel signal A(n,m).

Figure 18A:
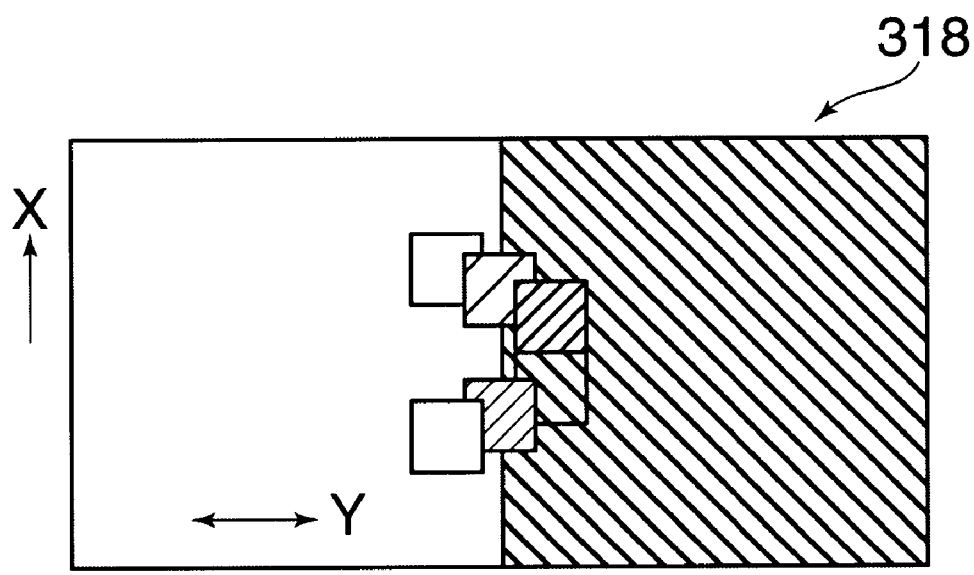
FIGS. 18A and 18B are diagrams showing an array of pixel signals produced when an image carried on a transmissive subject and representing a boundary between light and dark regions along an auxiliary scanning direction is read by the line sensor and a generated image signal is processed by the first moving-average processor.
Figure 18B:
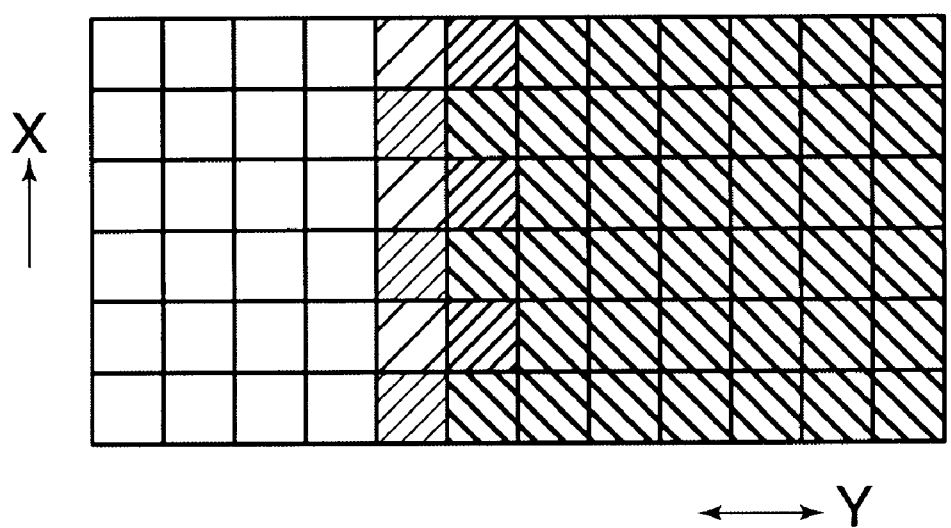
Figure 19A:
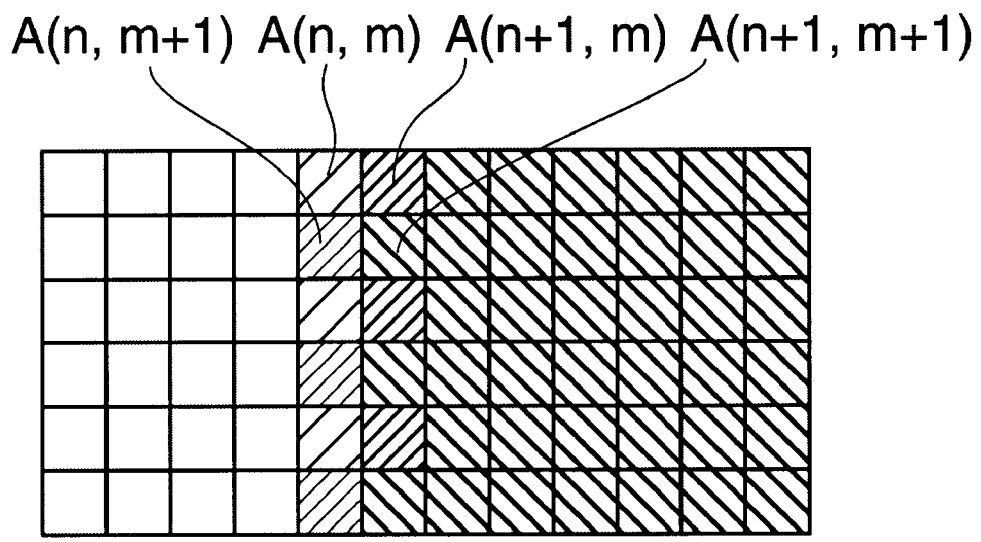
FIGS. 19A and 19B are diagrams showing an array of pixel signals produced when an image carried on a transmissive subject and representing a boundary between light and dark regions along an auxiliary scanning direction is read by the line sensor and a generated image signal is processed by the second moving-average processor.

If an image 318 shown in FIG. 18A is read by the transducer 28, the first moving-average processor 270 generates pixel signals arranged in the auxiliary scanning direction and having signal levels as shown in FIG. 18B. The second moving-average processor 272 calculates a moving average of two adjacent pixel signals that are successively arranged in the auxiliary scanning direction, thereby removing irregularities of the pixel signals in the auxiliary scanning direction. Specifically, if it is assumed that two nth pixel signals along mth and (m+1)th scanning lines in the auxiliary scanning direction are represented respectively by A(n,m), A(n,m+1), as shown in FIG. 19A, then the pixel signal A(n,m) is converted into a new pixel signal A(n,m) by a moving average process according to the following equation:

$$A(n,m) = \{A(n,m) + A(n,m+1)\}/2$$

Figure 19B:
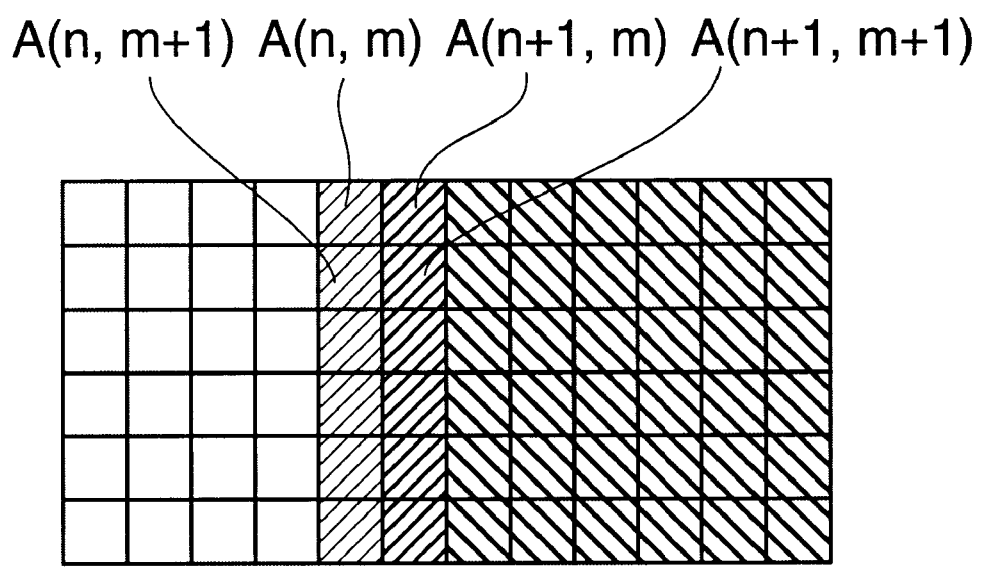

Likewise, the pixel signal A(n+1,m) is also converted into a new pixel signal A(n+1,m) by a moving average process. As shown in FIG. 19B, an image generated on the basis of the new pixel signals A(n,m), A(n+1,m), . . . is a highly accurate image free of irregularities in the auxiliary scanning direction.

Figure 20:
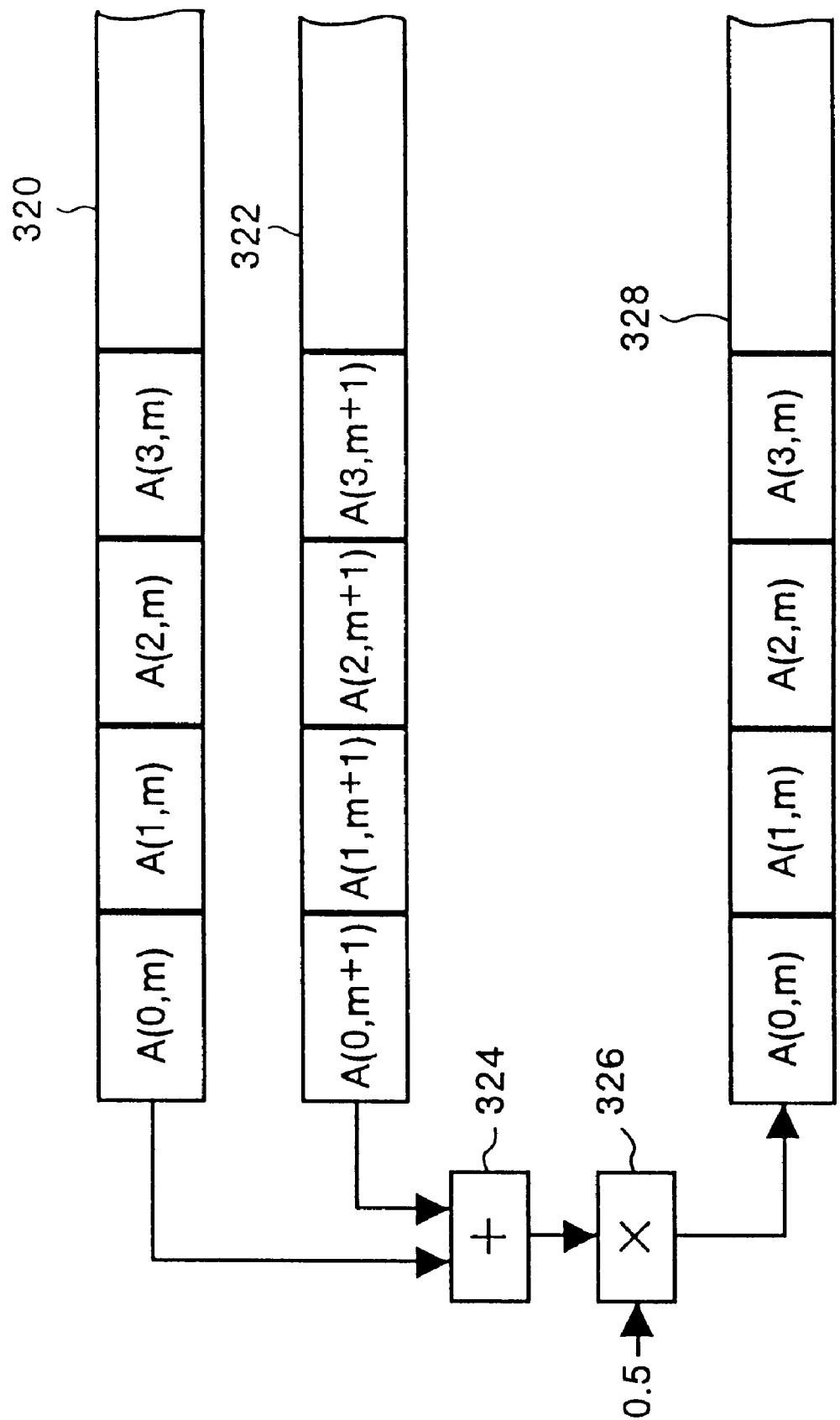
FIG. 20 is a block diagram of a processing circuit for generating a new pixel signal A (n, m) capable of producing a highly accurate image that is free of irregularities in the auxiliary scanning direction.

The new pixel signal A(n,m) may be generated by a processing circuit as shown in FIG. 20. As shown in FIG. 20, the pixel signals A(n,m), A(n,m+1) from which irregularities in the main scanning direction have been removed by the processing circuit shown in FIG. 17 are stored in two line buffer 320, 322 for each scanning line. Pixel signals A(0,m), A(0,m+1), for example, adjacent to each other in the auxiliary scanning direction and stored in the line buffers 320, 322 are added by an adder 324, and the sum signal from the adder 324 is multiplied by "0.5" by a multiplier 326, which generates a new pixel signal A(0, m) that is an average of the pixel signals A(0, m), A(0, m+1). The new pixel signal A(0, m) is stored in a line buffer 328. Similarly, the other pixel signals A(n,m), A(n,m+1) are processed by a moving average process, generating a new pixel signal A(n,m).

The pixel signals that have been processed by the moving average process with respect to the main and auxiliary scanning directions are supplied to the image processor 274, which carries out desired image processing on the supplied pixel signals.

While the line sensors 26b, 26g, 26r are displaced by the 2/3 pixel in the above embodiment, the line sensors 26b, 26g, 26r may be displaced a distance different from the 2/3 pixel insofar as the distance is smaller than the distance between adjacent photoelectric transducer elements. Generally, when the piezoelectric device 70 is controlled to displace the line sensors 26b, 26g, 26r in the main scanning direction by a distance M:

$$M = P \cdot n \cdot 2/(2 \cdot k+1)$$

(k: an integer of 1 or more)
where P represents the center-to-center distance between two adjacent photoelectric transducer elements and n represent a variable that successively changes from 1 to 2 k, it is possible to alternately store odd-numbered pixel signals and even-numbered pixel signals from the photoelectric transducer elements into the line buffers 278A, 278B, and to increase the resolution. In this case, the second moving-average processor 272 determines a moving average of N (=2·k+1) successive pixel signals arranged along the forward and return strokes in the main scanning direction for generating pixel signals capable of producing a highly accurate image that is free of irregularities in the main scanning direction.

When the process of reading the image from the transmissive subject 22 comes to an end, the system controller supplies a control signal indicative of rotation in the reverse direction to the drive circuit of the subject table feed system 36. In response to the control signal, the drive circuit supplies a control current to the motor 220, which rotates the drive shaft 158 in the reverse direction about its own axis, feeding the subject table 32 with the subject cassette 12 mounted thereon back toward the cassette insertion slot 14.

While the subject table 32 is being fed back, the lower portion of the presser 200 moves toward the operating finger 210. When the end of the subject table 32 projects out of the housing 16, i.e., when the subject table 32 is in its initial state, the operating finger 210 pushes the lower portion of the presser 200 inwardly in the housing 16 against the bias of the helical tension spring 202. The upper portion of the presser 200 lies parallel to the bottom of the cavity 150 of the subject table 32, whereupon the subject cassette 12 is released from the presser 200.

When the subject table 32 is positioned in its initial state, the system controller issues a control signal indicative of rotation in the reverse direction to the loading mechanism 164. The drive rollers 174 are rotated in the reverse direction, feeding the subject cassette 12 on the subject table 32 through the cassette insertion slot 14 out of the housing 16. When the subject cassette 12 becomes manually removable from the housing 16, the drive rollers 174 stop rotating, and the image reading process in the image reading apparatus 10 is finished.

In the image reading apparatus 10, as described above, the line sensors 26b, 26g, 26r are displaced by vibrations applied from the piezoelectric device 70 to the vibratory base 62. Since the piezoelectric device 70 is fixed to the support base 60 by the attachment unit 88 such that the tip end 70a thereof (see FIG. 9) abuts against the vibratory base 62, the piezoelectric device 70 can vibrate the vibratory base 62 efficiently, with the result that the line sensors 26b, 26g, 26r can be displaced high accurately for reproducing images of high quality.

Because the piezoelectric device 70 is removably fixed to the support base 60 by the attachment unit 88, the piezoelectric device 70 can independently be replaced with a new one. Therefore, when the piezoelectric device 70 is damaged or broken, it alone can be replaced and the transducer 28 does not need to be replaced in its entirety.

The image reading apparatus 10 does not need repeated optical position adjustments and can reproduce images of high quality, and its manufacturing and running costs are relatively low as the piezoelectric device 70 can independently be replaced with a new one.

The vibratory base 62 is defined by the slit 80 defined in the support base 60 and the recesses 82a, 82b defined in the support base 60 parallel to the opposite ends 80a, 80b of the slit 80, and is displaceable with respect to the support base 60 through the thin walls 84a, 84b left between the opposite ends 80a, 80b and the recesses 82a, 82b. Inasmuch as the support base 60 and the vibratory base 62 are coupled to each other by the thin walls 84a, 84b, the vibratory base 62 can easily be displaced by the piezoelectric device 70 for displacing the line sensors 26b, 26g, 26r easily and accurately in the main scanning direction.

The curved corners of the opposite ends 80a, 80b of the slit 80 have the same radius of curvature as the radius of curvature of the curved corners of the recesses 82a, 82b. Therefore, when the vibratory base 62 is displaced by the piezoelectric device 70, the thin walls 84a, 84b are prevented from being broken under undue stresses, allowing the vibratory base 62 and hence the transducer 28 to operate for a long service life.

The threaded holes 102 spaced from each other by the distance Ld are defined in the bottom wall 100 of the attachment member 92, and the screw insertion hole 104 is defined in the adjustment member 90 and extends from its front to rear surface for insertion of the screw 110 to horizontally hold the piezoelectric device 70. The two positioning oblong holes 108 are defined in the adjustment member 90 and extend vertically from its upper to lower surface for insertion of the bolts 106 to be threaded into the threaded holes 102 defined in the bottom wall 100 of the attachment member 92. These holes offer the following advantages:

With the piezoelectric device 70 held horizontally, the bolts 106 are inserted through the respective oblong holes 108 and threaded into the respective threaded holes 102 of the attachment member 92. Before the bolts 106 are firmly tightened, since the adjustment member 90 is movable in the axial direction of the piezoelectric device 70, i.e., along the major axis of the oblong holes 108, the projection length Lp of the piezoelectric device 70 can easily be adjusted. Using the attachment jig 114 shown in FIG. 9, the attachment member 92 is fixed to the unit attachment plate 126 that is fixed to the base 118 in and along the central groove 116b. The micrometer 130 is then operated to push the piezoelectric device 70 until its tip end 70a abuts against the abutment plate 120 fixed to the base 118 in and along the groove 116a. In this fashion, the projection length of the piezoelectric device 70 can simply be adjusted to the predetermined value Lp, which is the same as the distance between the abutment plate 120 and the unit attachment plate 126.

A plurality of attachment jigs 114 having different distances between the abutment plate 120 and the unit attachment plate 126 may be made available, and the projection length Lp of the piezoelectric device 70 which is suited to the characteristics of the line sensors used and a desired resolution may be determined in advance by simulations or experiments. One of the attachment jigs 114 whose distance between the abutment plate 120 and the unit attachment plate 126 is equal to the determined projection length Lp may be used to adjust the actual projection length of the piezoelectric device 70. Therefore, the transducer 28 optimum for the characteristics of the line sensors used and the desired resolution may be prepared.

The projection length Lp of the piezoelectric device 70 can easily be varied by changing the position of the adjustment member 90 and the position where the bolts 106 are tightened. Therefore, the projection length Lp of the piezoelectric device 70 can quickly be adjusted to a suitable value even when the line sensors are changed because of a change in the specifications of an analog interface used, for example. Time and labor that need to be consumed for changing the design of the image reading apparatus 10 can thus greatly be reduced.

In the image reading apparatus 10, the line sensors 26b, 26g, 26r are displaceable in the main scanning direction by vibrations applied from the piezoelectric device 70. Pixel signals outputted from the line sensors 26b, 26g, 26r in e each of the displaced positions are arranged in the sequence of the photoelectric transducer elements of the line sensors 26b, 26g, 26r for reproducing the image. Because the apparent number of pixels in the main scanning direction is increased as the line sensors 26b, 26g, 26r are displaced, the resolution of the reproduced image is greatly increased. Consequently, a sufficient level of resolution can be achieved even when only a portion of the image carried by the transmissive subject 22 is read.

The image reading apparatus 10 can reproduce images of high quality without the need for a signal processing process to select one of a plurality of optical lenses, a mechanism for positioning the selected optical lens on the optical axis of the line sensors 26b, 26g, 26r, a mechanism for moving the selected optical lens along the optical axis of the line sensors 26b, 26g, 26r, and a mechanism for moving the subject cassette 12 in the main scanning direction, which have heretofore been required. For this reason, the image reading apparatus 10 can also be manufactured inexpensively and in a reduced size.

While an image is being read by the line sensors 26b, 26g, 26r, cooling air is drawn from behind the housing 16 by the cooling fans 226a, 226b that are positioned in front of the respective light sources 20a, 20b of the illuminating system 24, introduced through the suction passage 228 into the front portion of the housing 16, which is cooled by the cooling air. The cooling air is then discharged by the cooling fans 226a, 226b and led through the discharge passage 230 into the rear portion of the housing 16. At this time, since the cooling air flows across the light sources 20a, 20b, the light sources 20a, 20b, which generates much heat, are efficiently cooled.

Since the image reading apparatus 10 does not need various mechanisms that have heretofore been required, as described above, it has a reduced volume to be cooled, and only the cooling fans 226a, 226b are sufficient as a cooling source in the cooling system 38. This also allows the image reading apparatus 10 to be reduced in size and weight.

Furthermore, because the subject cassette 12 is positioned transversely and longitudinally with respect to the subject table 32 by the cassette positioning mechanism 34, the subject cassette 12 can be positioned reliably with respect to the subject table 32. As a result, the cassette positioning mechanism 34 does not need to include a vertical positioning mechanism, and hence is simplified in structure, resulting in a simplified structure of the image reading apparatus 10.

The loading mechanism 164 of the cassette positioning mechanism 34 includes the drive rollers 174 rotatably mounted on the support shaft 172 near the cassette insertion slot 14 for rolling contact with the upper surface of the subject cassette 12 to feed the subject cassette 12 in the auxiliary scanning direction. Therefore, a drive source of the loading mechanism 164 may comprise only a motor for rotating the drive rollers 174. The loading mechanism 164 can thus be relatively simple in structure, thus simplifying the cassette positioning mechanism 34.

The subject cassette 12 has the V-shaped grooves 54 defined respectively in its opposite side edges thereof and extending in the auxiliary scanning direction, and the flat rollers 184 of the side bearing mechanism 166 enter the V-shaped grooves 54 in the opposite sides of the subject cassette 12 as it moves inwardly, thus gripping the subject cassette 12 transversely. Accordingly, since the opposite sides of the subject cassette 12 are supported by the side bearing mechanism 166, the subject cassette 12 is positioned accurately transversely with respect to the subject table 32. As the side bearing mechanism 166 comprises simple rollers including the flat rollers 184 and the pressing rollers 184, 186, the cassette positioning mechanism 34 is relatively simple in structure.

The subject table feed system 36 includes the drive shaft 158 disposed below one of the light sources 20a and extending in the auxiliary scanning direction, and the guide shaft 160 disposed below the other light source 20b and extending in the auxiliary scanning direction. Accordingly, a drive source of the subject table feed system 36 may comprise only the motor 220 for rotating the drive shaft 158. The subject table feed system 36 is thus relatively simple in structure and needs a relatively simple circuit arrangement.

The cooling fans 226a, 226b of the cooling system 38 are hinged to the housing 16 such that the lower surfaces of the cooling fans 226a, 226b can angularly move from respective positions facing the drive shaft 158 and the guide shaft 160 to respective positions parallel to the vertical direction. Consequently, when the lid 18 is opened with respect to the housing 16, i.e., when the lid 18 is lifted away from the housing 16, the cooling fans 226a, 226b may be angularly moved from the respective positions facing the drive shaft 158 and the guide shaft 160 to the respective positions parallel to the vertical direction. Since, at this time, the drive shaft 158 is exposed through the upper opening of the housing 16, the drive shaft 158 and hence subject table feed system 36 can easily be serviced for maintenance.

The illuminating system 24 includes the cylindrical diffusion cavity 224 extending between and connected to the light sources 20a, 20b and having the slit 222 defined in its area that faces the subject table 32, the slit 222 extending longitudinally in the main scanning direction. Therefore, the illuminating light L emitted from the light sources 20a, 20b is diffused and reflected in the cylindrical diffusion cavity 224, and is applied through the slit 222 to the transmissive subject 22 housed in the subject cassette 12. The light that passes through the transmissive subject 22 is converged onto the line sensors 26b, 26g, 26r which are positioned below the subject table 32, and photoelectrically converted into electric signals by the line sensors 26b, 26g, 26r.

Inasmuch as the illuminating light L emitted from the light sources 20a, 20b can effectively be guided toward the transmissive subject 22, the percentage at which the illuminating light L is utilized is increased, and the intensity of light needed for the line sensors 26b, 26g, 26r to generate good image signals is sufficiently available even without increasing the output level of light emitted from the light sources 20a, 20b.

Two modifications of the image reading apparatus will be described below with reference to FIGS. 21 through 29. Those parts shown in FIGS. 21 through 29 which are identical to those shown in FIGS. 11 and 12 are denoted by identical reference characters, and will not be described in detail below.

Figure 21:
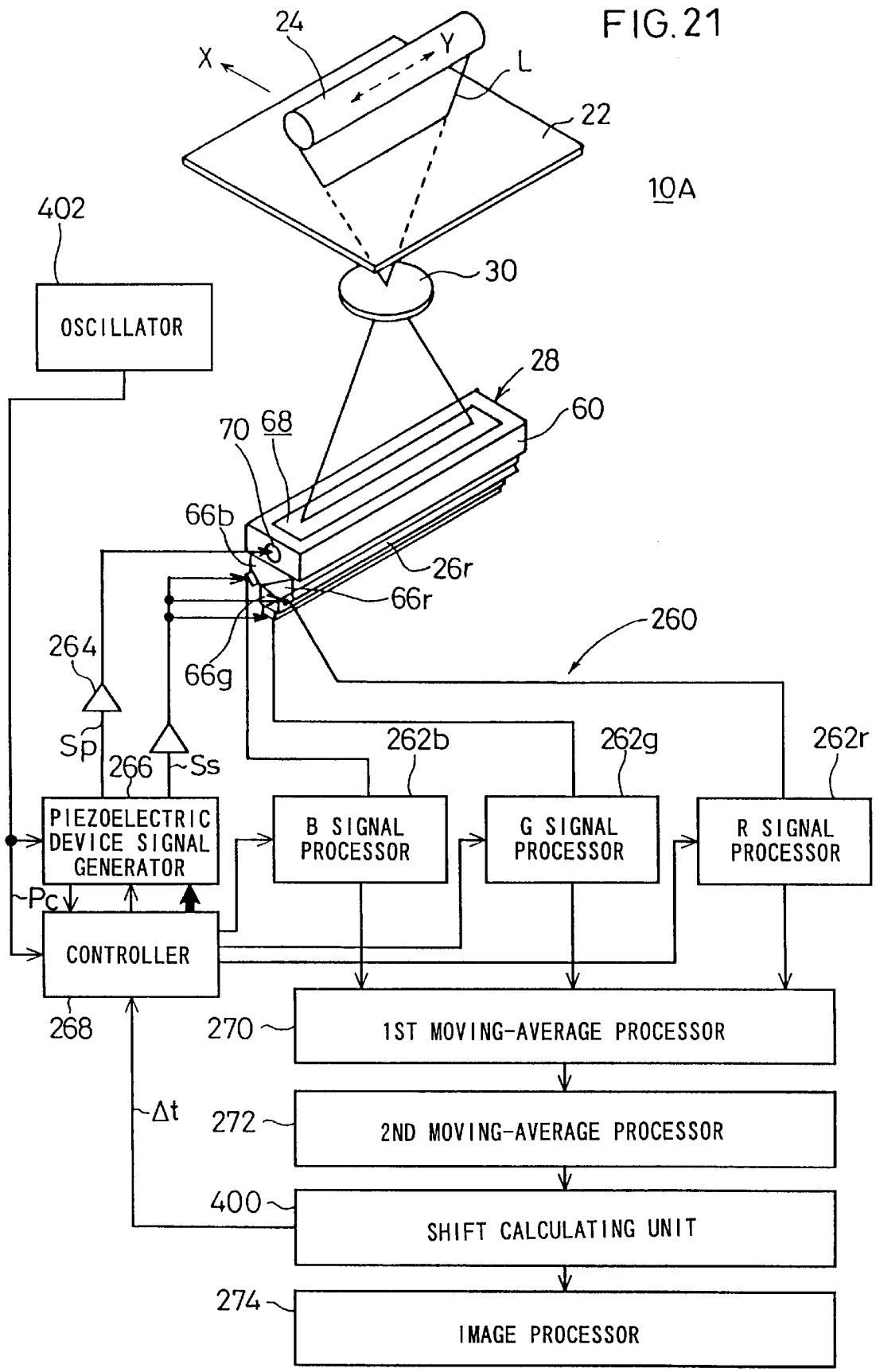
FIG. 21 is a block diagram of a signal processing system of an image reading apparatus according to a first modification.
Figure 22:
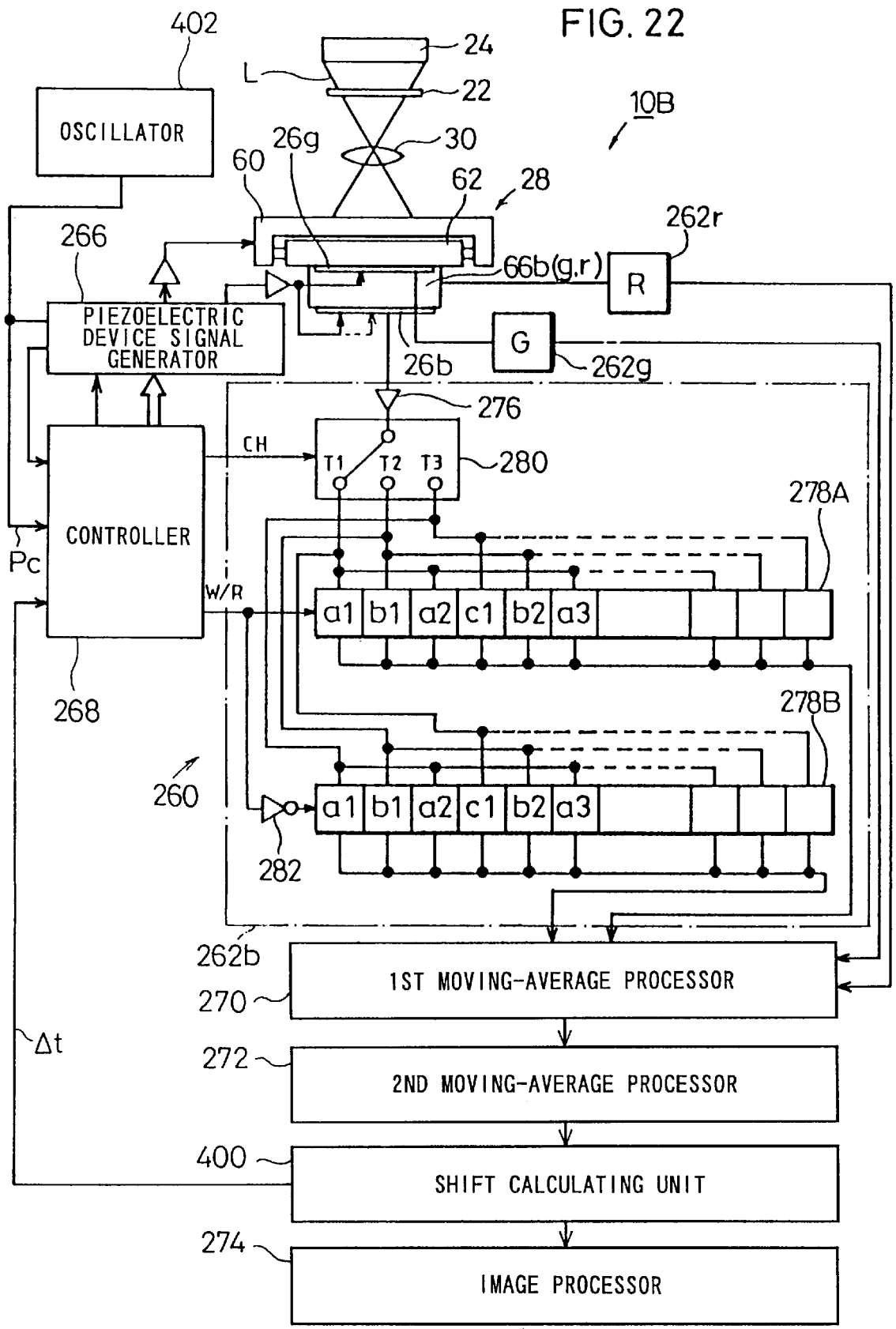
FIG. 22 is a detailed block diagram of the signal processing system of the image reading apparatus according to the first modification.

As shown in FIGS. 21 and 22, an image reading apparatus 10A according to a first modification is basically the same as the image reading apparatus 10 (see FIGS. 11 and 12), but differs therefrom in that it has a shift calculating unit 400 for calculating a pixel shift in the main scanning direction indicated by the arrow Y (FIG. 21) based on pixel signals from the second moving-average processor 272, and the piezoelectric device signal generator 266 generates a piezoelectric device signal Sp for actuating the piezoelectric device 70 and sensor drive signals Ss for energizing the line sensors 26b, 26g, 26r based on a reference clock signal Pc from an oscillator 402.

Figure 23:
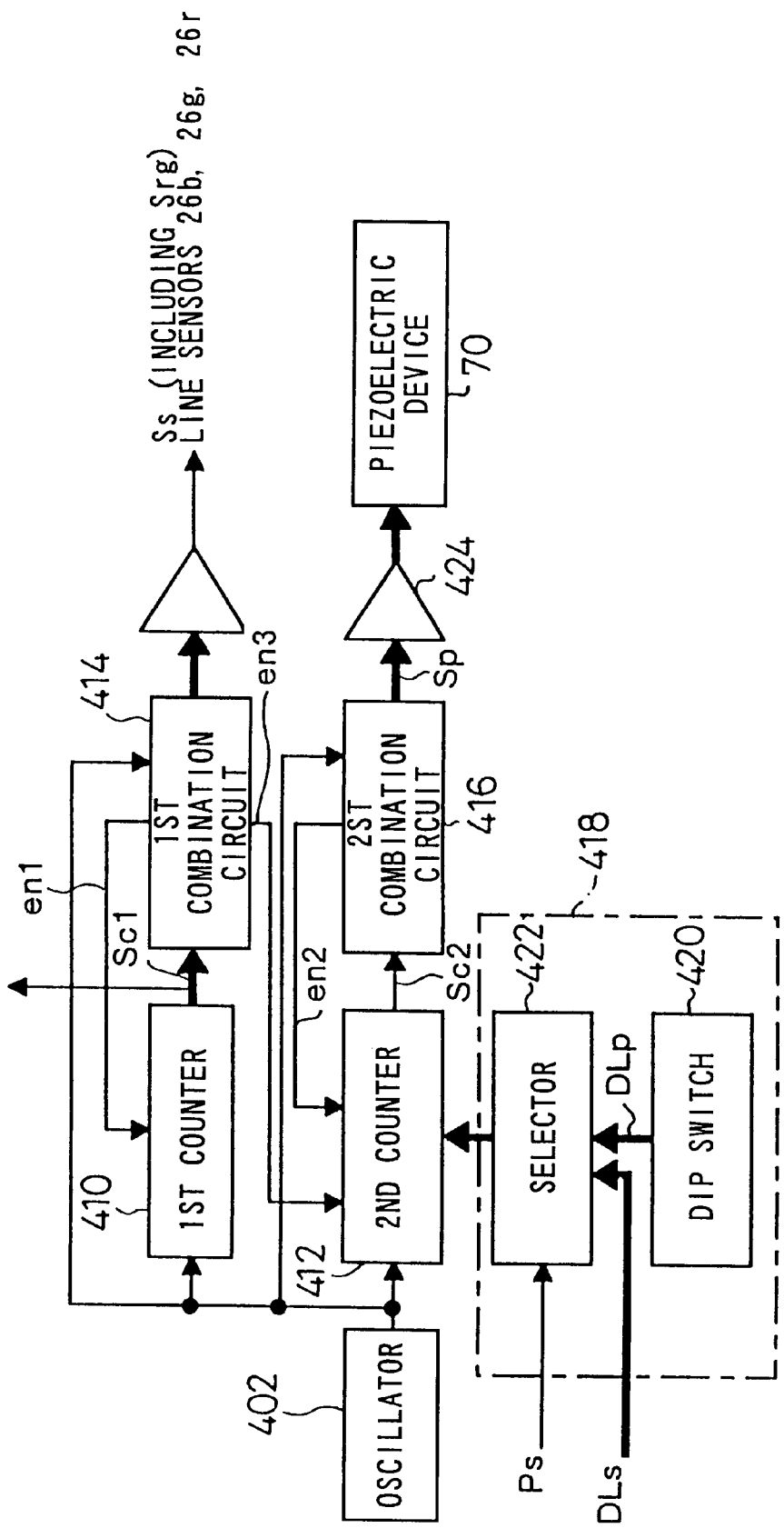
FIG. 23 is a block diagram of a piezoelectric device signal generator of the image reading apparatus according to the first modification.

As shown in FIG. 23, the piezoelectric device signal generator 266 comprises a first counter 410 for counting reference clock pulses Pc from the oscillator 402 while a first enable signal en1 is of a low level, for example, and generating a carry signal Sc1 when its count reaches a predetermined count, a second counter 412 for counting reference clock pulses Pc from the oscillator 402 while a second enable signal en2 is of a low level, for example, and generating a carry signal Sc2 as a piezoelectric device drive clock signal Sc2 when its count reaches a predetermined count, a first combination circuit 414 energizable into an enable mode capable of receiving the reference clock signal Pc in response to the carry signal Sc1 from the first counter 410, for generating a drive signal to be supplied to the line sensors 26b, 26g, 26r, e.g., the sensor drive signals Ss including a charge reading clock signal Srg, a CCD transfer clock signal, and a reset clock signal (pulses applied to a reset gate of an FDA (floating diffusion gate), based on the reference clock signal Pc from the oscillator 402, and a second combination circuit 416 energizable in response to the piezoelectric device drive clock signal Sc2 from the second counter 412 for generating the piezoelectric device signal (voltage signal) Sp to be supplied to the piezoelectric device 70, based on the reference clock signal Pc from the oscillator 402.

The first and second enable signals en1, en2 are supplied from the respective first and second combination circuits 414, 416 to the respective first and second counters 410, 412. Because the first and second counters 410, 412 are required to count reference clock pulses at all times, a ground potential is applied as the first and second enable signals en1, en2 to the first and second counters 410, 412.

The second counter 412 is supplied with a setting value (load value) DL loaded from an external source in response to a third enable signal en3. The third enable signal en3 is generated by the first combination circuit 414, for example. For example, the third enable signal en3 is generated as a pulse signal having a predetermined pulse duration, which has a positive-going edge synchronous with a negative-going edge of the charge reading clock signal Srg, and is supplied to the second counter 412.

The setting value DL loaded into the second counter 412 is generated by an offset setting unit 418. The offset setting unit 418 has a selector 422 for selecting either digital data (load value DLs) supplied from the controller 268 through an interface or an initial value DLp preset by a DIP switch 420, based on a selection signal Ps supplied from the controller 268.

When the image reading apparatus 10A is switched on or energized after it has been reset, the selector 422 switches to the DIP switch 420 based on the selection signal Ps supplied from the controller 268 for thereby applying the initial value DLp from the DIP switch 420 to the second counter 412. While the image reading apparatus 10A is in operation, the selector 422 switches to the controller 268 based on the selection signal Ps supplied from the controller 268 for thereby applying load value DLs from the controller 268 to the second counter 412.

While being supplied with the third enable signal en3, the second counter 412 reads the load value DL (DLp or DLs) supplied from the selector 422, and starts counting reference clock pulses Pc from the load value DL. Therefore, when the second counter 412 reads the load value DL at the time the first and second counters 410, 412 simultaneously start counting reference clock pulses Pc, the second counter 412 outputs the piezoelectric device drive clock signal Sc2 earlier than the first counter 410 outputs the carry signal Sc1 by a time interval td or ts that corresponds to the load value DLs or the initial value DLp.

Figure 24:
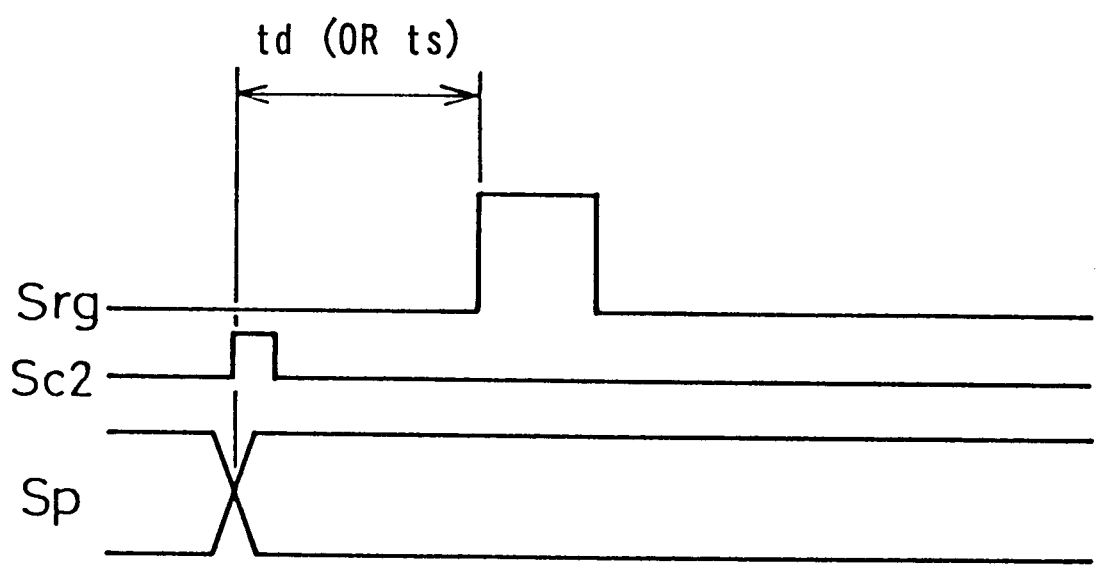
FIG. 24 is a timing chart of a charge reading clock signal, a piezoelectric device drive clock signal, and a piezoelectric device signal which are generated by the drive signal generator.

Specifically, as shown in FIG. 24, the first combination circuit 414 issues the charge reading clock signal Srg at a time which is later than the time at which the piezoelectric device drive clock signal Sc2 to be supplied to the piezoelectric device 70 is issued, by the time interval td corresponding to the load value DL. In the illustrated example, the carry signal Sc1 issued from the first counter 410 and the charge reading clock signal Srg issued from the first combination circuit 414 are synchronous with each other. Therefore, the carry signal Sc1 issued from the first counter 410 is also supplied to the controller 268 for use as a timing signal for the signal processors 262b, 262g, 262r.

A load value corresponding to the settling time for the vibrations of the piezoelectric device 70 is employed as the initial value DLp established by the DIP switch 420.

The shift calculating unit 400 comprises a microcomputer, for example, and calculates a pixel shift in the main scanning direction when a shift calculating program that has been read from a program ROM and stored in a working RAM when the image reading apparatus 10A is switched on is initiated.

Figure 25A:
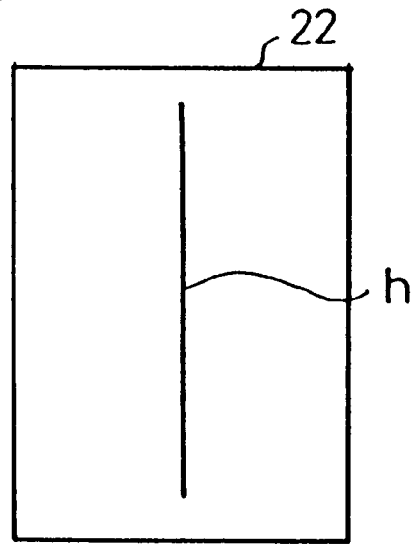
FIGS. 25A through 25C are diagrams illustrative of the principles of operation of a shift calculating unit of the image reading apparatus according to the first modification.
Figure 25B:
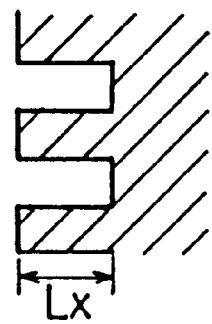

The principles of the calculation of a pixel shift will be described below. As shown in FIG. 25A, a line "h" drawn on the subject 22 in the auxiliary scanning direction indicated by the arrow X (see FIG. 21). The line "h" is read by the line sensors 26b, 26g, 26r, and the image processor 274 generates a reproduced image based on pixel signals produced by the first moving-average processor 270 and the second moving-average processor 272. If the piezoelectric device 70 is vibrated back and forth along forward and reverse strokes by different distances, then as shown in FIG. 25B, any density gradient in the main scanning direction Y on the subject 22 will appear as a tooth-shaped jaggy edge along the auxiliary scanning direction X.

Figure 25C:
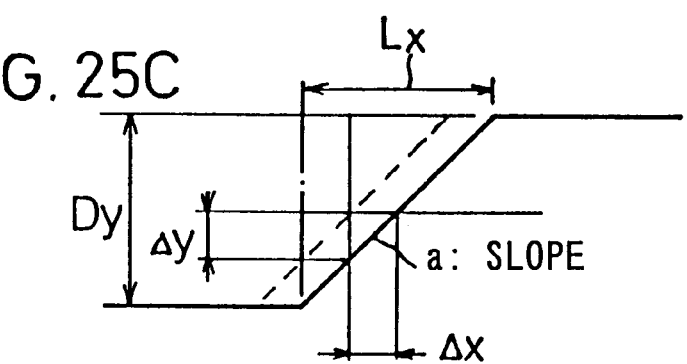

As shown in FIG. 25C, the density gradient in the main scanning direction Y, reproduced as the tooth-shaped jaggy edge, has a slope "a" that is determined by a correlated length Lx of the tooth-shaped jaggy edge and a density difference Dy. If the line sensors 26b, 26g, 26r are displaced between three positions (S1→S2→S3, S3→S2→S1) in each of the forward and reverse strokes, as shown in FIG. 14, and also if it is assumed that the density of a cluster of three pixels in the auxiliary scanning direction X and one pixel in the main scanning direction Y is represented by Y1(i) (i indicates a pixel in the main scanning direction Y) for the forward stroke and the density of a cluster of three pixels in the auxiliary scanning direction X and one pixel in the main scanning direction Y is represented by Y2(i) for the reverse stroke, then a change $\Delta x$ in the correlated length Lx, i.e., a shift $\Delta x$, is equal to a change $\Delta y$ in the density gradient/the slope "a", and is expressed by the following equation:

$$\Delta x = \Delta y / a$$

$$= \{Y1(i) - Y2(i)\} / \{Y1(i) - Y1(i-1)\}$$

The above equation is applied to all the pixels along the main scanning direction Y to calculate shifts $\Delta x$, and a maximum value thereof is regarded as a present shift $\Delta x$. Thereafter, the shift $\Delta x$ is converted into time information $\Delta t$ according to a conversion equation $\Delta t = b \times \Delta x$ where b is a proportionality constant calculated on the basis of an experiment according to the specifications of the image reading apparatus (including a computer simulation).

The time information $\Delta t$ calculated by the shift calculating unit 400 is supplied to the controller 268. The controller 268 converts the supplied time information $\Delta t$ into a load value DLs based on the reference clock signal Pc, and the load value DLs is supplied to the offset setting unit 418 (see FIG. 23).

As a consequence, a delay td corresponding to the time information $\Delta t$ is inserted between the time at which the piezoelectric device drive clock signal Sc2 is outputted to the piezoelectric device 70 and the time at which the sensor drive signals Ss, particularly the charge reading clock signal Srg, are outputted to the line sensors 26b, 26g, 26r.

The shift calculating unit 400 should preferably include a decision unit for determining whether the calculated time information $\Delta t$ is to be supplied to the controller 268 or not. The decision unit has an allowable jaggy edge range depending on the characteristics of the image reading apparatus, and does not supply the time information $\Delta t$ to the controller 268 if the change $\Delta x$ in the correlated length Lx satisfies the following formula:

$$|\Delta x| \leq K \cdot L$$

i.e., if the change $\Delta x$ is equal to or smaller than the product of the apparent length L of a pixel in the main scanning direction Y (if the resolution is threefold and the essential length of one pixel is 9 $\mu$m, then L=9 $\mu$m/3=3 $\mu$m) and an allowable coefficient K (of 0.05, for example), and supplies the time information $\Delta t$ to the controller 268 if the change $\Delta x$ in the correlated length Lx is in excess of the product. The above process carried out by the decision unit is effective to prevent a system for actuating the piezoelectric device 70 from chattering and also to prevent a feedback control system from oscillating, so that the system for actuating the piezoelectric device 70 will operate highly reliably.

Operation of the image reading apparatus 10A will be described below with reference to a timing chart shown in FIG. 26. In order to clarify the positional relationship between voltage levels of the piezoelectric device signal Sp and the line sensors 26b, 26g, 26r, the piezoelectric device signal Sp will be described as three voltage signals P1, P2, P3 having respective voltage levels (0 V, $\alpha$ V, $\beta$ V).

The subject 22 with an image recorded thereon is two-dimensionally scanned as it is mechanically fed in the auxiliary scanning direction X and is illuminated in the main scanning direction Y by the illuminating system 24. The illuminating light L that has passed through the subject 22 is converged by the condenser lens 30, and then divided into light rays of the colors B, G, R by the prisms 66b, 66g, 66r and the dichroic filters 146a, 146b (see FIG. 5) of the transducer 28. These light rays of the colors B, G, R are applied to the respective line sensors 26b, 26g, 26r.

Immediately after the image reading apparatus 10A is switched on, the controller 268 supplies a selection signal Ps to the piezoelectric device signal generator 266 to select the DIP switch 420. The second counter 412 is therefore supplied with the initial value DLp from the DIP switch 420 through the selector 422. As shown in FIG. 26, the piezoelectric device signal generator 266 outputs the charge reading clock signal Srg with a delay of the settling time ts for the piezoelectric device 70 from the time at which the piezoelectric device drive clock signal Sc2 is outputted.

Based on the carry signal Sc1 from the first counter 410, the controller 268 supplies the selection signal CH and the write/read signal W/R to the B signal processor 262b, the G signal processor 262g, and the R signal processor 262r for thereby processing pixel signals from the transducer 28.

In response to the piezoelectric device drive clock signal Sc2 from the second counter 412, the second combination circuit 416 outputs the voltage signal Sp of 0 V, for example, and supplies same through the amplifier 424 to the piezoelectric device 70. Thereafter, after a delay of the time interval ts corresponding to the initial value DLp of the DIP switch 420, the first combination circuit 414 supplies the charge reading clock signal Srg to the line sensors 26b, 26g, 26r. Signal charges stored in the photoelectric transducer elements of the line sensors 26b, 26g, 26r are now transferred to a CCD charge transfer unit. Based on the CCD transfer clock signal from the first combination circuit 414, the signal charges are transferred successively as image signals (pixel signals) through the CCD charge transfer unit.

In response to the carry signal Sc1, the controller 268 supplies the selection signal CH to the switch 280 to connect the line sensors 26b, 26g, 26r to the terminal T1 thereof, and also supplies the write/read signal W/R to the line buffers 278A, 278B, placing the line buffer 278A in the write enable mode and the line buffer 278B in the read enable mode.

Since the piezoelectric device signal P1 is of 0 V, the vibratory base 62 sandwiched between the helical spring 74 and the piezoelectric device 70 is held in the non-displaced initial position S1 (see FIG. 14). Pixel signals a1, a2, a3, . . . generated by the photoelectric transducer elements of the line sensors 26b, 26g, 26r are amplified by the amplifier 276, supplied through the terminal T1 of the switch 280, and stored respectively in 1st, 3rd, 6th, 9th, . . . storage areas (see FIG. 22) of the line buffer 278A.

Then, in response to the piezoelectric device drive clock signal Sc2 from the second counter 412, the second combination circuit 416 outputs the piezoelectric device signal P2 of $\alpha$ V, and supplies same through the amplifier 424 to the piezoelectric device 70. At this time, the piezoelectric device 70 is expanded (or contracted), displacing the vibratory base 62 in the main scanning direction Y by a 2/3 pixel of the photoelectric transducer elements of the line sensors 26b, 26g, 26r. The line sensors 26b, 26g, 26r are displaced to the position S2 (see FIG. 14) that is displaced from the initial position S1 by the distance equal to the 2/3 pixel.

In response to the next carry signal Sc1 from the first counter 410, the controller 268 supplies the selection signal CH to the switch 280, connecting the line sensors 26b, 26g, 26r to the terminal T2 of the switch 280. Pixel signals b1, b2, b3, . . . generated by the photoelectric transducer elements of the line sensors 26b, 26g, 26r are amplified by the amplifier 276, supplied through the terminal T2 of the switch 280, and stored respectively in 2nd, 5th, 8th, . . . storage areas of the line buffer 278A.

Thereafter, in response to the piezoelectric device drive clock signal Sc2 from the second counter 412, the second combination circuit 416 outputs the piezoelectric device signal P3 of β V, and supplies same through the amplifier 424 to the piezoelectric device 70. The piezoelectric device 70 is expanded (or contracted), displacing the vibratory base 62 in the main scanning direction Y by a 2/3 pixel of the photoelectric transducer elements of the line sensors 26b, 26g, 26r. The line sensors 26b, 26g, 26r are displaced to the position S3 (see FIG. 14) that is displaced from the initial position S1 by the distance equal to the 4/3 pixel.

In response to the next carry signal Sc1 from the first counter 410, the controller 268 supplies the selection signal CH to the switch 280, connecting the line sensors 26b, 26g, 26r to the terminal T3 of the switch 280. Pixel signals c1, c2, c3, . . . generated by the photoelectric transducer elements of the line sensors 26b, 26g, 26r are amplified by the amplifier 276, supplied through the terminal T3 of the switch 280, and stored respectively in 4th, 7th, 10th, . . . storage areas of the line buffer 278A.

In this manner, the line buffer 278A successively stores the pixel signals a1, b1, a2, c1, b2, a3, . . . along a first main scanning line which are generated while the line sensors 26b, 26g, 26r are being displaced along a forward stroke in the main scanning direction Y from the initial position S1 through the position S2 to the position S3.

Then, in response to the piezoelectric device drive clock signal Sc2 from the second counter 412, the second combination circuit 416 also outputs the piezoelectric device signal P3 of β V, and supplies same through the amplifier 424 to the piezoelectric device 70. The piezoelectric device 70 is maintained in the position S3 displaced from the initial position S1 by the distance equal to the 4/3 pixel.

In response to the next carry signal Sc1 from the first counter 410, the controller 268 supplies the selection signal CH to the switch 280 to connect the line sensors 26b, 26g, 26r to the terminal T1 thereof, and also supplies the write/read signal W/R to the line buffers 278A, 278B, placing the line buffer 278A in the read enable mode and the line buffer 278B in the write enable mode.

While controlling the switch 280, the controller 268 controls the piezoelectric device signal generator 266 to successively supply the piezoelectric device signals P3, P2, P1 for storing pixel signals c1, c2, c3, . . . from the line sensors 26b, 26g, 26r in the position S3, pixel signals b1, b2, b3, . . . from the line sensors 26b, 26g, 26r in the position S2, and pixel signals a1, a2, a3, . . . from the line sensors 26b, 26g, 26r in the initial position S1 into the line buffers 278B.

The piezoelectric device signal P2 that is generated subsequently to the piezoelectric device signal P3 is of a level lower than the α V in view of the hysteresis of the piezoelectric device 70.

Consequently, the line buffer 278B successively stores the pixel signals a1, b1, a2, c1, b2, a3, . . . along a second main scanning line which are generated while the line sensors 26b, 26g, 26r are being displaced along a return stroke in the main scanning direction from the position S3 through the position S2 to the initial position S1. The pixel signals thus stored in the line buffers 278A, 278B provide a resolution that is three times higher than the resolution which would be achieved if the line sensors 26b, 26g, 26r were fixed in position.

Theoretically, it is possible to reproduce a highly accurate image free of irregularities in the main scanning direction Y with new pixel signals generated by the first moving-average processor 270 and the second moving-average processor 272. Actually, however, since the piezoelectric device 70 is vibrated back and forth along forward and reverse strokes by different distances, when the line "h" drawn on the subject 22 as shown in FIGS. 25A through 25C is read by the line sensors 26b, 26g, 26r and a reproduced image is generated by the image processor 274 based on the pixel signals, any density gradient in the main scanning direction Y on the subject 22 will appear as a tooth-shaped jaggy edge along the auxiliary scanning direction X.

In the image reading apparatus 10A, however, the shift calculating unit 400 connected to the output of the second moving-average processor 272 serves to supply the time information Δt corresponding to the shift Δx produced by the shift calculating unit 400 to the controller 268. The controller 268 converts the time information Δt into the load value DLs depending on the reference clock signal Pc and supplies the load value DLs to the offset setting unit 418 of the piezoelectric device signal generator 266. Since the controller 268 supplies the selection signal Ps to select the load value DLs to the selector 422, the second counter 412 reads the load value DLs from the controller 268, and starts its counting from the load value DLs. Therefore, the piezoelectric device signal generator 266 outputs the charge reading clock signal Srg with a delay of the time interval td corresponding to the load value DLs from the time at which the piezoelectric device drive clock signal Sc2 is outputted. Thus, the piezoelectric device 70 is actuated with optimum timing with respect to the reading of electric charges. As a result, the reproduced image is free of the jaggy edge.

The pixel signals which have been subjected to the moving average process with respect to the main scanning direction Y and the auxiliary scanning direction X and also to the shift correction process are supplied to the image processor 274 where they are processed.

As described above, in the image reading apparatus 10A, the piezoelectric device signal generator 266 is capable of adjusting the times at which to output the charge reading clock signal Srg and the piezoelectric device drive clock signal Sc2 for thereby outputting the charge reading clock signal Srg and the piezoelectric device drive clock signal Sc2 at different times.

Generally, if the piezoelectric device 70 is used to displace the line sensors 26b, 26g, 26r, then the piezoelectric device 70 and the line sensors 26b, 26g, 26r are vibrated over a certain period of time (settling time ts) when the piezoelectric device 70 is actuated. Therefore, if signal charges read from the line sensors 26b, 26g, 26r within the settling time ts are processed directly as image signals, then the reproduced image tends to be disturbed, and its image quality is apt to be degraded. It would be possible not to read signal charges during a period of time corresponding to the setting time ts for thereby minimizing any disturbance of the reproduced image. However, such a proposal would reduce the percentage of effective pixels, i.e., a group of effective pixels except for black-level detecting pixels and dummy pixels, resulting in a limitation on efforts to increase the resolution.

According to the image reading apparatus 10A, however, the piezoelectric device signal generator 266 delays the time at which the charge reading clock signal Srg is outputted with respect to the time at which the piezoelectric device drive clock signal Sc2 is outputted.

For example, when the image reading apparatus 10A is switched on or energized after it has been reset, the time at which the charge reading clock signal Srg is outputted is delayed for the time interval ts corresponding to the initial value DLp preset by the DIP switch 420. While the image reading apparatus 10A is in operation, the time at which the charge reading clock signal Srg is outputted is delayed for the time interval td based on the time information Δt corresponding to the shift Δx produced by the shift calculating unit 400.

Therefore, after elapse of the delay time corresponding to the time interval ts or td from the time at which the voltage is applied to the piezoelectric device 70, signal charges are read from the line sensors 26b, 26g, 26r. It is thus not necessary to intentionally fail to read effective pixels of the line sensors 26b, 26g, 26r. As a result, the percentage of effective pixels used and hence the resolution can be increased.

As a consequence, the line sensors 26b, 26g, 26r are capable of reading an image while they are being displaced by the piezoelectric device 70, so that no wasteful consumption of the scanning time will occur.

Since the delay time of the charge reading clock signal Srg with respect to the piezoelectric device drive clock signal Sc2 is established on the basis of the time information Δt corresponding to the shift Δx in the main scanning direction Y produced by the shift calculating unit 400, when an image is read while the line sensors 26b, 26g, 26r are being displaced to generate a reproduced image, the sharpness of the original image will not be lost in the reproduced image, and hence the reproducibility of the original image will be increased.

An image reading apparatus 10B according to a second modification will be described below with reference to FIGS. 27 through 29.

Figure 27:
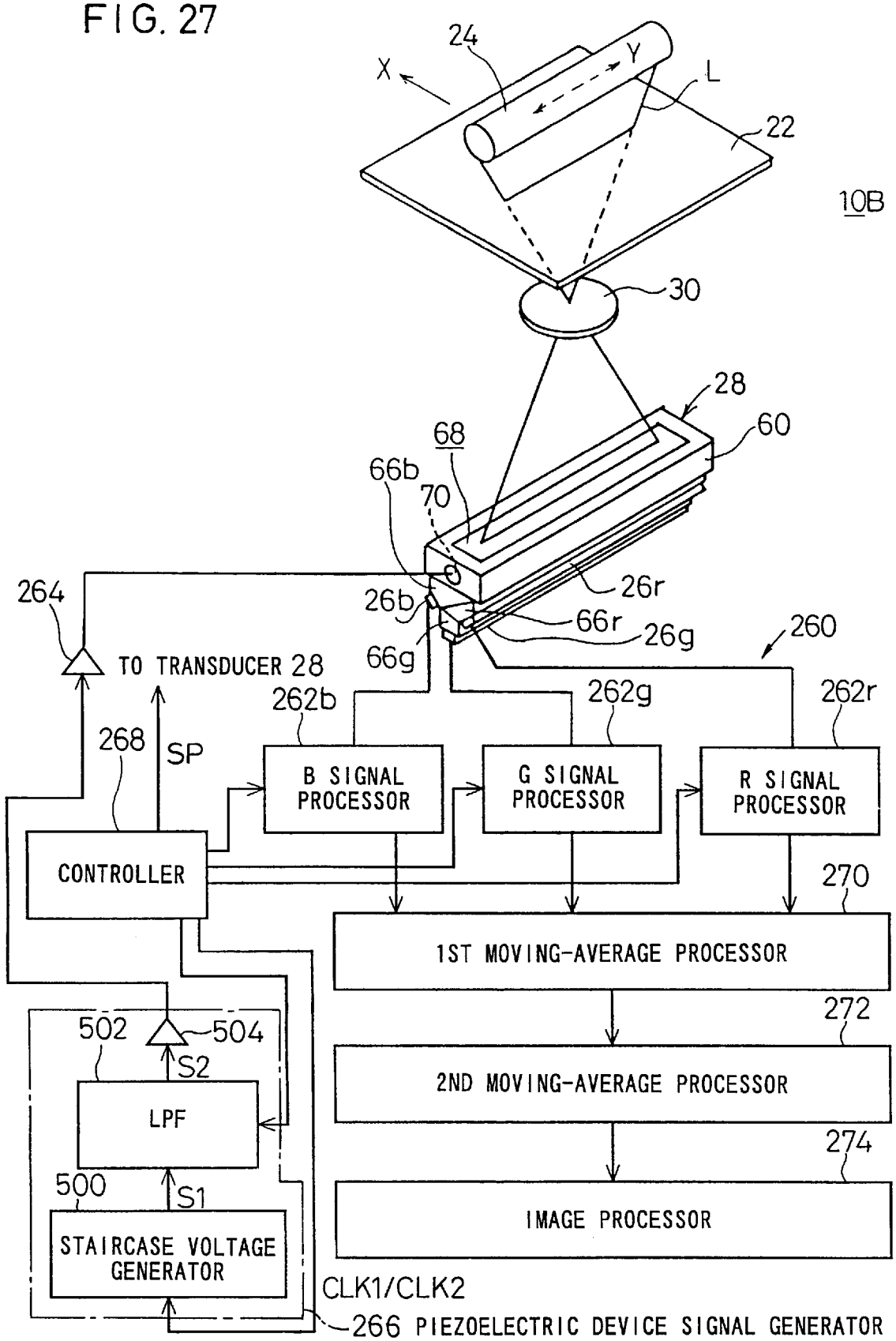
FIG. 27 is a block diagram of a signal processing system of an image reading apparatus according to a second modification.

As shown in FIG. 27, the image reading apparatus 1OB according to the second modification is basically the same as the image reading apparatus 10 (see FIGS. 11 and 12), but differs therefrom in that the piezoelectric device signal generator 266 has a staircase voltage generator 500, a low-pass filter 502, and an amplifier 504.

Figure 28:
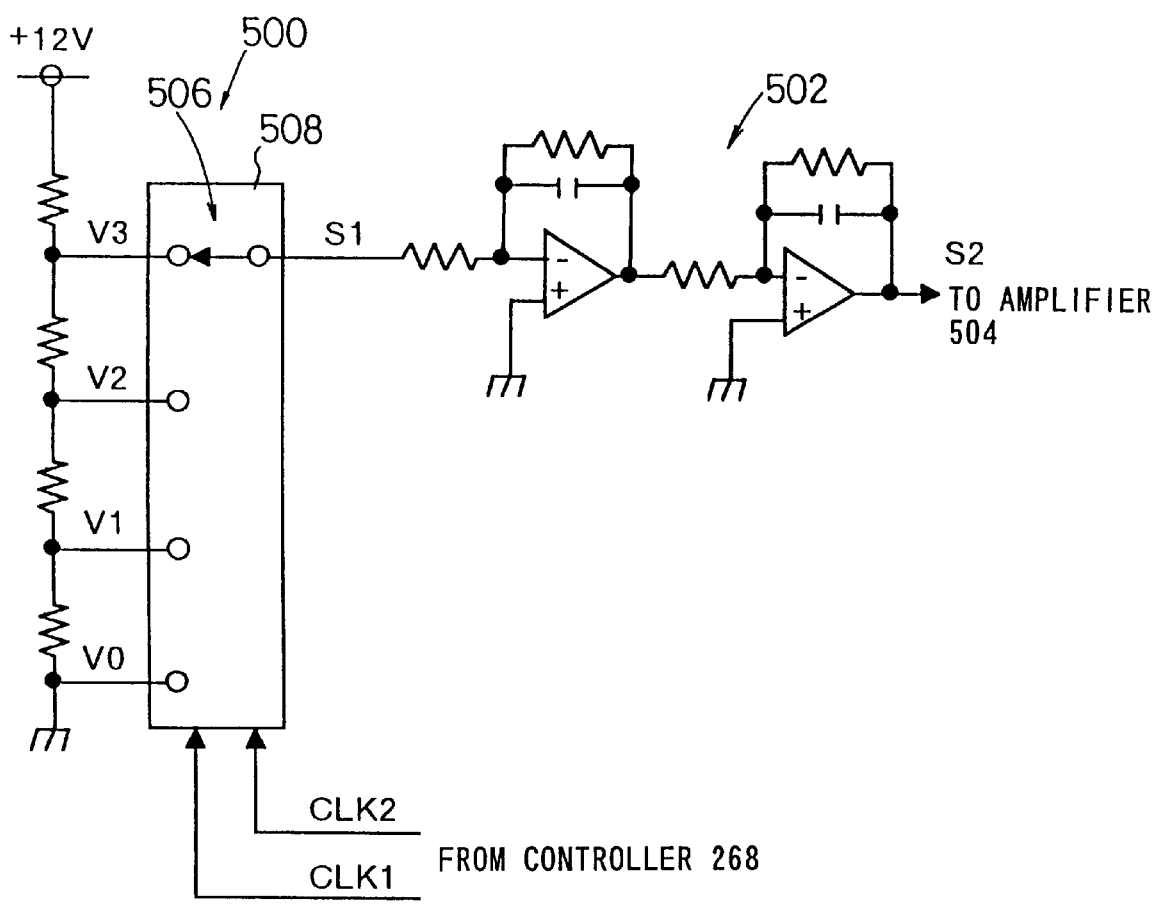
FIG. 28 is a circuit diagram of a staircase voltage generator and a low-pass filter of the image reading apparatus according to the second modification.

FIG. 28 shows in detail the staircase voltage generator 500 and the low-pass filter 502 of the piezoelectric device signal generator 266. the staircase voltage generator 500 has a multiplexer 508 comprising an analog switch 506 which is controlled depending on the levels of two clock signals CLK1, CLK2 supplied from the controller 268. The analog switch 506 has one movable contact and four fixed contacts. The analog switch 506 can be controlled to successively supply voltages V0=0 V, V1, V2, V3 produced by dividing a DC voltage of +12 V, to an output terminal thereof, thus generating a staircase voltage (also called a staircase wave, a staircase signal, a staircase voltage signal, or a displacement signal) S1. The staircase voltage S1 is applied to the low-pass filter 502.

The low-pass filter 502 comprises two cascaded active filters each comprising a resistor, a capacitor, and an operational amplifier, and serves as a second-order low-pass filter with a combined cutoff frequency. The capacitors may be connected parallel to each other and switched by an analog switch to vary the frequency characteristics of the filter depending on a control voltage from the controller 268. The circuit arrangement of the low-pass filter 502 shown in FIG. 28 is of a conceptual nature only. Actually, the low-pass filter 502 may be of a single circuit comprising an operational amplifier, a plurality of resistors and capacitors for use as a second-order low-pass filter. According to the second modification, a staircase signal S2 outputted from the low-pass filter 502 has a maximum amplitude of about 10 V, and the amplifiers 504, 264 amplify the voltage amplitude from about 10 V to about 150 V. In response to the amplified voltage, the piezoelectric device 70 is expanded and contracted for a distance of about 10 and several μm in the auxiliary scanning direction X.

Operation of the image reading apparatus 10B will be described below with reference to a timing chart shown in FIG. 29. Photoelectrically converted signals outputted from the line sensors 26b, 26g, 26r are processed in the same manner as described above. It is assumed that according to the second modification the line sensors 26b, 26g, 26r are displaced a distance which is the same as the distance M described with the conventional sensor. Specifically, the line sensors 26b, 26g, 26r are displaced in the main scanning direction by successive distances M=0, M=p·2/3, M=p·4/3 where p represents the pitch between the centers of adjacent ones of the photoelectric transducer pixels.

In FIG. 27, the subject 22 with an image recorded thereon is two-dimensionally scanned as it is mechanically fed in the auxiliary scanning direction X and is illuminated in the main scanning direction Y by the illuminating system 24. The illuminating light L that has passed through the subject 22 is converged by the condenser lens 30, and then divided into light rays of the colors B, G, R by the prisms 66b, 66g, 66r and the dichroic filters 146a, 146b (see FIG. 5) of the transducer 28. These light rays of the colors B, G, R are applied to the respective line sensors 26b, 26g, 26r.

Figure 29:
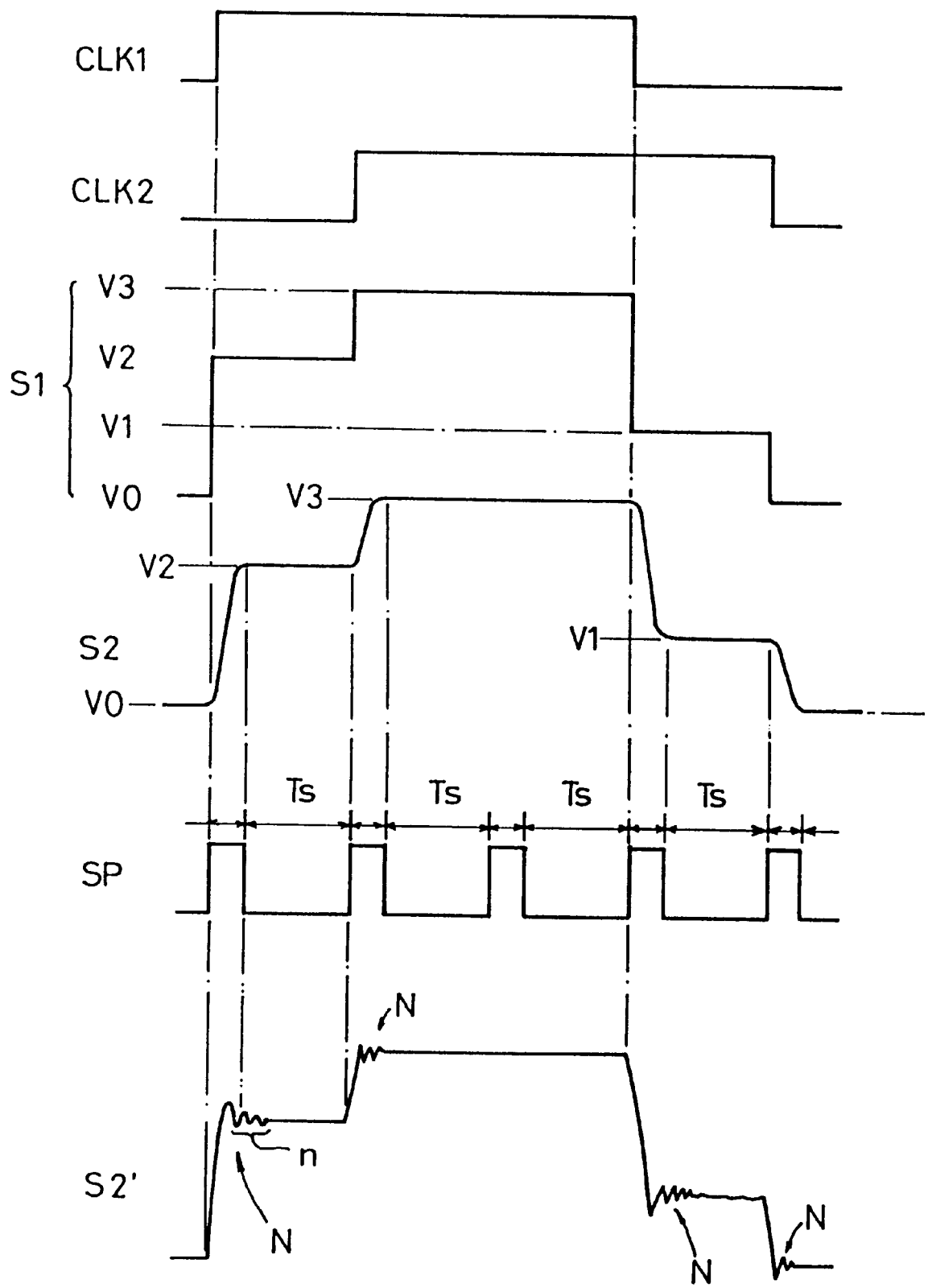
FIG. 29 is a diagram showing signal waveforms illustrative of how a piezoelectric device is energized in the image reading apparatus according to the second modification.

When the image is read, the controller 268 supplies two clock signals CLK1, CLK2 shown in FIG. 29 to the piezoelectric device signal generator 266.

Depending on the combination of the levels of the clock signals CLK1, CLK2, the staircase voltage generator 500 controls the switch 506 to move its movable contact to the fixed contacts in a given pattern to generate a staircase signal S1 of four levels shown in FIG. 9.

When the staircase signal S1 passes through the low-pass filter 502, high-frequency components are removed from the staircase signal S1 depending on the frequency characteristics of the low-pass filter 502, which outputs a staircase signal S2 having dull positive- and negative-going edges. The staircase signal S2 is amplified by the amplifiers 504, 264 and supplied to the piezoelectric device 70.

When the level of the staircase signal S2 changes from the voltage V0 to the voltage V2, the piezoelectric device 70 is expanded, displacing the vibratory base 62 a certain distance in the main scanning direction Y (see FIG. 2) thereby to displace the line sensors 26b, 26g, 26r by the distance M=p·2/3. When the level of the staircase signal S2 changes from the voltage V2 to the voltage V3, the line sensors 26b, 26g, 26r are further displaced in the main scanning direction Y also by the distance M=p·2/3. As a result, the line sensors 26b, 26g, 26r have been displaced the sum distance of M=p·4/3. When the level of the staircase signal S2 changes from the voltage V3 to the voltage V1 and then from the voltage V1 to the voltage V0, the piezoelectric device 70 is contracted successive distances M=p·2/3, moving back the line sensors 26b, 26g, 26r in the opposite direction.

The voltages are selected such that when the voltages V2, V1 are applied to the piezoelectric device 70 in the position (referred to as an original position) corresponding to the voltage V0, the line sensors 26b, 26g, 26r are displaced the same distance M=p·2/3 pixel.

The different voltages V2, V1 are applied to displace the line sensors 26b, 26g, 26r by the same distance M because the piezoelectric device 70 exhibits a hysteresis with respect to the application of voltages thereto.

In FIG. 29, the controller 268 supplies shift pulses SP to the line sensors 26b, 26g, 26r. In response to positive-going edges of the shift pulses SP, stored charges are shifted at one time from the photoelectric transducer pixels (charge storage areas) of the line sensors 26b, 26g, 26r to odd-numbered charge transfer areas. In charge storage times Ts from negative-going edges of the shift pulses SP to next positive-going edges thereof, pixels signals from the line sensors 26b, 26g, 26r are supplied to the B, G, R signal processors 262b, 262g, 262r in response to transfer clock pulses.

A comparison between the waveform of the staircase signal S2 from the low-pass filter 502 and the waveform of the shift pulses SP indicates that the staircase signal S2 supplied to the piezoelectric device 70 is of a constant DC level in the charge storage times Ts. In the charge storage times Ts, therefore, the line sensors 26b, 26g, 26r are not vibrated, and there will not be caused spatial frequency changes which would otherwise occur if the line sensors 26b, 26g, 26r were vibrated minute intervals while the image is being read, i.e., in the charge storage times Ts. As a result, the line sensors 26b, 26g, 26r can produce image signals of high quality.

In FIG. 29, the reference character S2' represents the waveform of a staircase signal which would be applied to the piezoelectric device 70 if the low-pass filter 502 were dispensed with. The staircase signal S2' has voltage levels V0, V1, V2, V3 as is the case with the staircase signal S1. The staircase signal S2' suffers waveform aberrations N such as overshoot, ringing, etc. at its positive-going edges. If the shift pulses SP are of the waveform shown in FIG. 29 and the staircase signal S2' were applied to the piezoelectric device 70, then the piezoelectric device 70 and hence the line sensors 26b, 26g, 26r would be vibrated minute intervals due to the waveform aberrations N which would not sufficiently be attenuated in the charge storage times Ts. As a consequence, the spatial frequency of the generated image signal would be degraded.

If only negative-going edges of the shift pulses SP are shifted further to the right in FIG. 29 so as not to be affected by the waveform aberrations N, then since the charge storage times Ts will be shortened, the photoelectric conversion sensitivity of the line sensors 26b, 26g, 26r will be lowered. If the charge storage times Ts are increased to avoid such a shortcoming, then the overall signal processing time will be increased, reducing the speed at which the subject 22 can be read.

If the low-pass filter 502 were dispensed with, then the frequency characteristics of the amplifiers 504, 264 for amplifying the voltage of about 10 V to the voltage of 150 V for actuating the piezoelectric device 70 would also be responsible for causing the waveform aberrations N. Inasmuch as the low-pass filter 502 is inserted, such a drawback is eliminated.

The line sensors 26b, 26g, 26r can be vibrated by the staircase signal S2 and also mechanical vibrations caused by the mechanical system including the piezoelectric device 70 itself, the support base 60, the vibratory base 62, and the helical spring 74. However, because the effect which these mechanical vibrations have on the image signals can considerably be lessened by the low-pass filter 502, the burden imposed on a vibration suppression mechanism including the helical spring can be reduced.

Stated otherwise, inasmuch as the frequency characteristics of the low-pass filter 502 can be controlled with ease as they are electrically controlled, the vibration suppression mechanism can be simplified and the cost thereof can be reduced by controlling the staircase signal S2 applied to the piezoelectric device 70 through the low-pass filter 502.

Moreover, mechanical stresses applied from the vibration suppression mechanism to the line sensors 26b, 26g, 26r are smaller and the vibration suppression mechanism itself is simpler than with the conventional apparatus which does not have the low-pass filter 502. Consequently, the reliability of the image reading apparatus 10B as represented by MTBF (mean time between failures), for example, can be increased.

Although certain preferred embodiments of the present invention has been shown and described in detail, it should be understood that various changes and modifications may be made therein without departing from the scope of the appended claims.

What is claimed is:

1. An image reading apparatus comprising:
    an image reader having at least one line sensor for optically reading an image carried on an image placed on a subject table and producing an image signal; and
    a sensor displacing unit for displacing said image reader in a main scanning direction of said line sensor;
    said sensor displacing unit comprising:
        a support base;
        a vibratory base disposed displaceably with respect to said support base, said image reader being fixed to said vibratory base;
        a piezoelectric device for displacing said vibratory base, said piezoelectric device having a vibration generating region; and
        an attachment unit by which said piezoelectric device is detachably fixed to said support base, with said vibration generating region being held against said vibratory base.

2. An image reading apparatus according to claim 1, wherein said vibratory base is defined by a slit which is defined in said support base and has opposite ends bent toward said image reader fixed to said vibratory base, and recesses defined in said support base along said opposite ends of the slit, leaving thin walls between said opposite ends and said recesses, so that said vibratory base is displaceable with respect to said support base.

3. An image reading apparatus according to claim 2, wherein said opposite ends of the slit and said recesses have curved corners which have the same radius of curvature.

4. An image reading apparatus according to claim 1, wherein said attachment unit comprises:
    an adjustment member for fixing said piezoelectric device and adjusting a projection length of said piezoelectric device; and
    an attachment member for installing said piezoelectric device on said support base with said adjustment member accommodated in the attachment member.

5. An image reading apparatus according to claim 4, wherein said attachment member has a surface on which said adjustment member is placed, said surface having a plurality of spaced threaded holes defined therein, said adjustment member having a horizontal holder for horizontally holding said piezoelectric device and a plurality of positioning oblong holes defined therein for passage therethrough of a plurality of adjustment bolts threaded into said threaded holes, respectively.

6. An image reading apparatus comprising:
    at least one line sensor having an array of photoelectric transducer elements as pixels, for reading signal charges stored respectively in said photoelectric transducer elements in response to an external reading clock signal and outputting the signal charges as image signals;

sensor displacing means for displacing said line sensor to a plurality of positions in a main scanning direction along the array of the pixels in response to an external drive clock signal;

storage means for storing the image signals from said line sensor in each of said positions;

image signal arranging means for arranging said image signals in a sequence of the pixels in said main scanning direction and storing the arranged image signals in said storage means; and timing adjusting means for adjusting times at which said reading clock signal and said drive clock signal are outputted so that said reading clock signal is output after said drive clock signal.

7. An image reading apparatus according to claim 6, wherein said timing adjusting means comprises means for adjusting said times to introduce a time interval therebetween which corresponds to a pixel shift in said main scanning direction which is caused in an image reproduced from the image signals when said line sensor is displaced by said sensor displacing means.

8. An image reading apparatus comprising:

at least one line sensor having an array of photoelectric transducer elements as pixels, for reading signal charges stored respectively in said photoelectric transducer elements in response to an external reading clock signal and outputting the signal charges as image signals;

sensor displacing means for displacing said line sensor to a plurality of positions in a main scanning direction along the array of the pixels in response to an external drive clock signal;

storage means for storing the image signals from said line sensor in each of said positions;

image signal arranging means for arranging said image signals in a sequence of the pixels in said main scanning direction and storing the arranged image signals in said storage means; and timing adjusting means for adjusting times at which said reading clock signal and said drive clock signal are outputted, wherein said timing adjusting means comprises means for adjusting said times to introduce a time interval therebetween which corresponds to a pixel shift in said main scanning direction which is causes in an image reproduced from the image signals when said line sensor is displaced by said sensor displacing means, wherein said timing adjusting means comprises:

a first counter for counting reference clock pulses and outputting a first timing signal for said reading clock signal upon counting said reference clock pulses up to a predetermined count;

a second counter for counting said reference clock pulses and outputting a second timing signal for said drive clock signal upon counting said reference clock pulses up to a predetermined count; and offset setting means for presetting said second counter to an offset value corresponding to said time interval.

9. An image reading apparatus comprising:

a line sensor having a plurality of interconnected photoelectric transducer pixels for photoelectrically reading a subject in a main scanning direction;

a feed mechanism for feeding said subject with respect to said line sensor in an auxiliary scanning direction transverse to said main scanning direction for thereby two-dimensionally reading image information carried by said subject;

a piezoelectric device for displacing said line sensor back and forth in said main scanning direction to shift said photoelectric transducer pixels for increasing a resolution of an image reproduced from said image information;

staircase signal generating means for generating a staircase signal and supplying the staircase signal to said piezoelectric device; and a low-pass filter connected between said staircase signal generating means and said piezoelectric device.

* * * * *